United States Patent
Kim

(10) Patent No.: US 8,233,863 B2
(45) Date of Patent: Jul. 31, 2012

(54) MOBILE TERMINAL HAVING ELECTRONIC PAPER AND METHOD FOR CONTROLLING THE SAME

(75) Inventor: Jong Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 206 days.

(21) Appl. No.: 12/690,773

(22) Filed: Jan. 20, 2010

(65) Prior Publication Data

US 2010/0184485 A1 Jul. 22, 2010

(30) Foreign Application Priority Data

Jan. 20, 2009 (KR) ........................ 10-2009-0004657

(51) Int. Cl.
*H04W 40/00* (2009.01)

(52) U.S. Cl. ....... 455/158.4; 455/566; 345/1.1; 345/1.3; 345/2.1; 345/3.4; 345/5

(58) Field of Classification Search .................. None
See application file for complete search history.

(56) References Cited

U.S. PATENT DOCUMENTS

| | | | | |
|---|---|---|---|---|
| 6,522,347 B1 * | 2/2003 | Tsuji et al. | ..................... | 715/848 |
| 7,716,224 B2 * | 5/2010 | Reztlaff et al. | ............... | 707/741 |
| 7,748,634 B1 * | 7/2010 | Zehr et al. | ..................... | 235/492 |
| 7,990,338 B2 * | 8/2011 | Teng et al. | ..................... | 345/1.3 |
| 2002/0087555 A1 * | 7/2002 | Murata | ........................... | 707/10 |
| 2002/0158812 A1 * | 10/2002 | Pallakoff | ........................... | 345/5 |
| 2004/0051944 A1 * | 3/2004 | Stark | ............................ | 359/448 |
| 2005/0264540 A1 * | 12/2005 | Niwa | ............................ | 345/173 |
| 2006/0194619 A1 * | 8/2006 | Wilcox et al. | ................. | 455/566 |
| 2007/0097490 A1 * | 5/2007 | Kanbe | ........................... | 359/296 |
| 2007/0118671 A1 * | 5/2007 | Ganti | ............................. | 710/1 |
| 2007/0174918 A1 * | 7/2007 | Hirose et al. | ..................... | 726/26 |
| 2007/0273637 A1 * | 11/2007 | Zhou et al. | ..................... | 345/107 |
| 2008/0068292 A1 * | 3/2008 | Yuan et al. | ..................... | 345/2.1 |
| 2008/0072163 A1 * | 3/2008 | Teng et al. | ..................... | 715/761 |
| 2008/0247128 A1 * | 10/2008 | Khoo | ........................... | 361/681 |
| 2010/0059296 A9 * | 3/2010 | Abileah et al. | ............. | 178/18.09 |
| 2010/0156877 A1 * | 6/2010 | Kimura | .......................... | 345/211 |
| 2011/0106970 A1 * | 5/2011 | Song et al. | ..................... | 709/236 |

* cited by examiner

*Primary Examiner* — Patrick Edouard
*Assistant Examiner* — Julio Perez
(74) *Attorney, Agent, or Firm* — Lee, Hong, Degerman, Kang & Waimey

(57) ABSTRACT

A mobile terminal having electronic paper and a method for controlling the same are provided, wherein the mobile terminal comprises: a first display unit configured to implement a role of electronic paper; a second display unit configured to be mounted at one side of the first display unit for implementing a role of a light emitting display unit; a memory configured to store a program for implementing a predetermined menu; and a controller configured to display the menu on the first display unit or the second display unit.

15 Claims, 23 Drawing Sheets

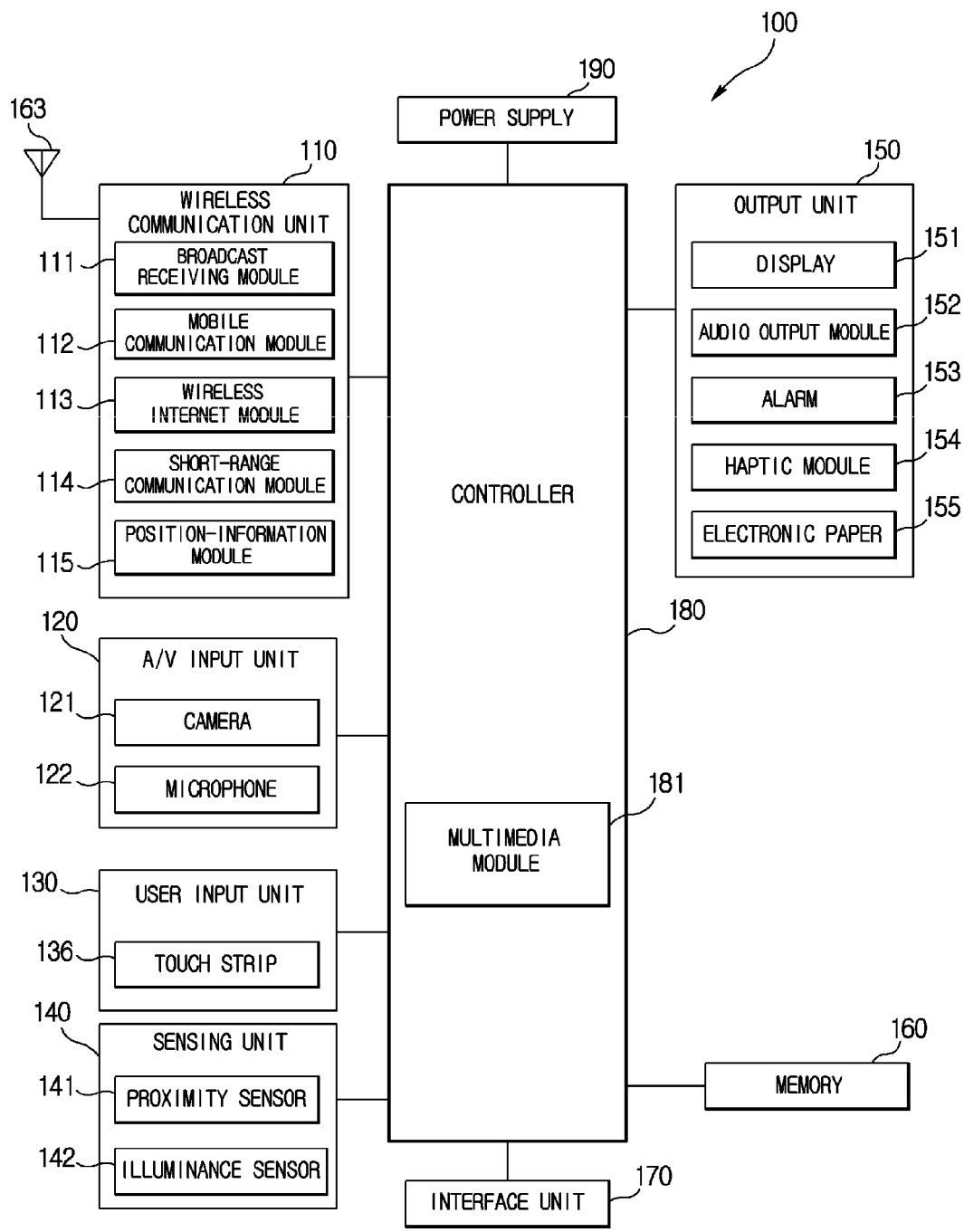

FIG. 8
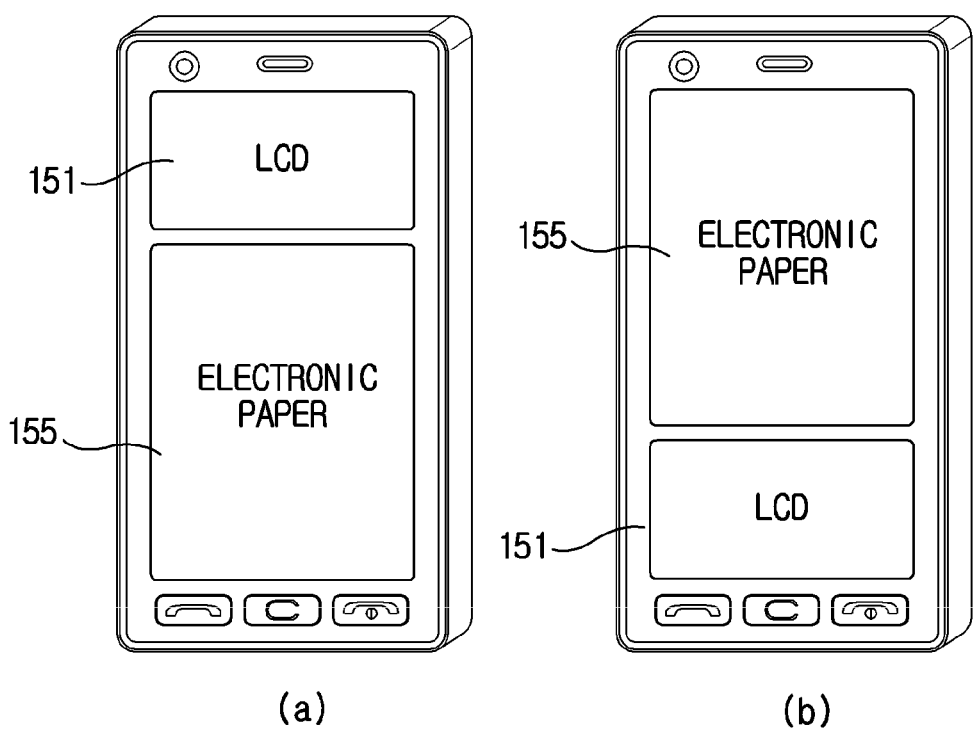
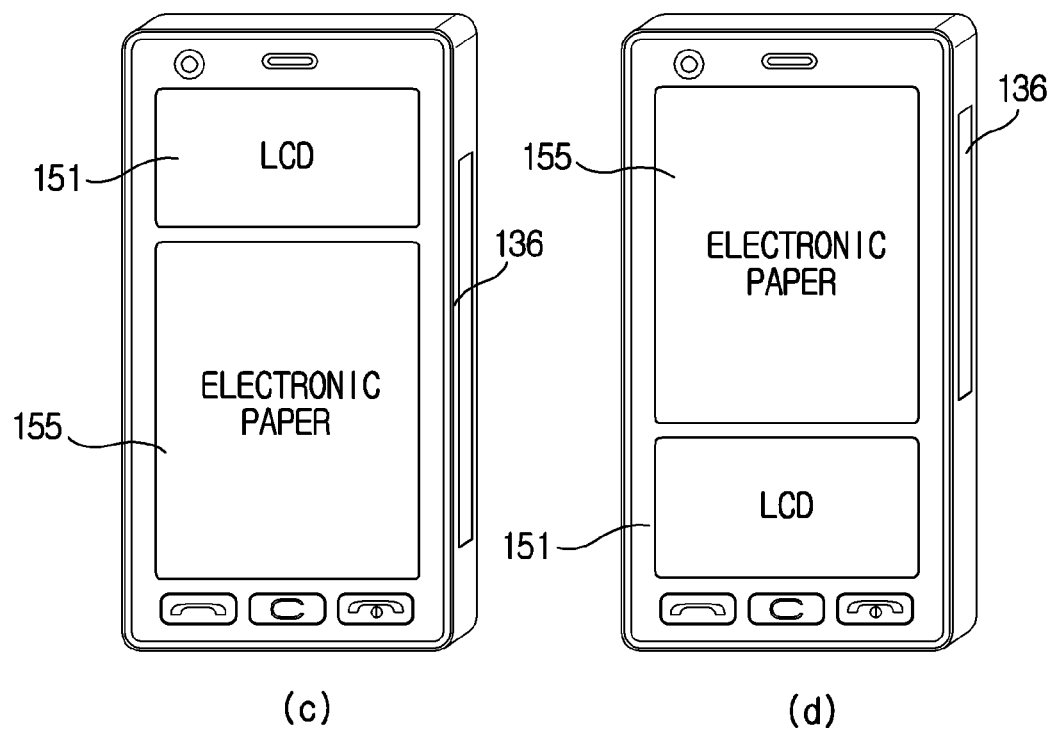

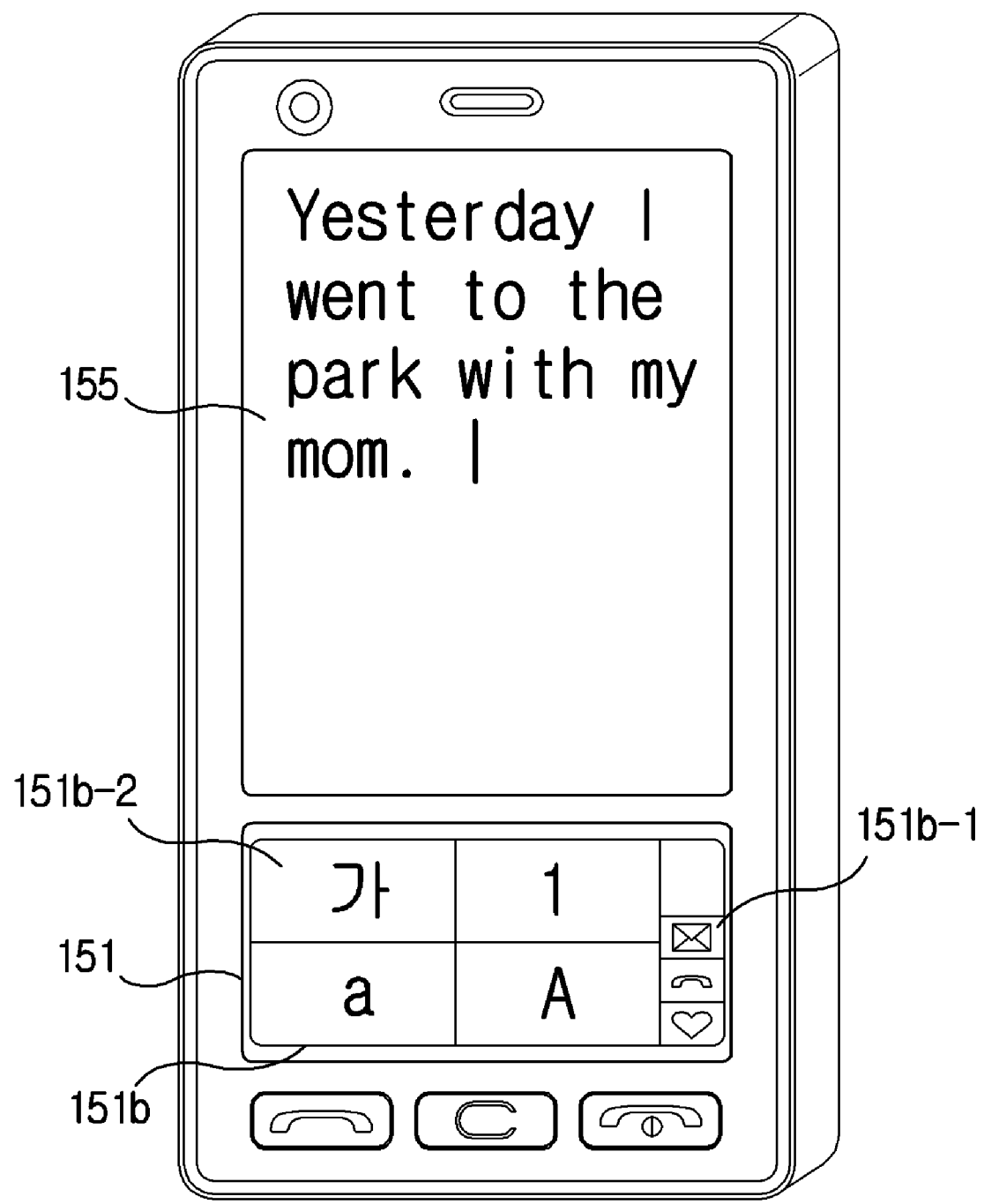

(a)            (b)

MOBILE TERMINAL HAVING ELECTRONIC PAPER AND METHOD FOR CONTROLLING THE SAME

Pursuant to 35 U.S.C. §119 (a), this application claims the benefit of earlier filing date and right of priority to Korean Patent Application No. 10-2009-0004657, filed on Jan. 20, 2009, the contents of which are hereby incorporated by reference in their entirety.

BACKGROUND OF THE DISCLOSURE

1. Field

The present disclosure relates to a mobile terminal having electronic paper and method for controlling the same.

2. Background

Generally, terminals may be classified into mobile/portable terminals and stationary terminals. The mobile terminals may be further classified into handheld terminals and vehicle mount terminals according to possibility of user's direct portability.

As functions of the terminal are diversified, the terminal is implemented as a multimedia player provided with composite functions such as photographing of photos or moving pictures, playback of music or moving picture files, game play, broadcast reception and the like, for example.

To implement the complex functions in the multimedia player, improvement of structural parts and/or software parts of the terminal may be considered in various attempts.

Generally, a mobile terminal employs an LCD (Liquid Crystal Diode) as a display and an OLED (Organic Light Emitting Diode) is recently used for the display.

However, the conventional mobile terminal suffers from a disadvantage in that it uses much power in a display.

SUMMARY

It is an object of the present disclosure to provide a mobile terminal having a beautiful exterior look and capable of reducing a power consumption and providing an UI (User Interface) convenient to a user.

In one general aspect of the present disclosure, a mobile terminal comprising: a first display configured to implement a role of electronic paper; a second display configured to be mounted at one side of the first display for implementing a role of a light emitting display; a memory configured to store a program for implementing a predetermined menu; and a controller configured to display the menu on the first display or the second display.

In some exemplary embodiments, the second display may be a touch screen.

In some exemplary embodiments, the second display may be displayed with a virtual keypad.

In some exemplary embodiments, the second display may perform a handwriting input.

In some exemplary embodiments, the first display may be displayed with an icon of the menu, and the second display may be displayed with a functional icon of the menu.

In some exemplary embodiments, the memory may store E-book data, the first display may be displayed with the E-book data, and the second display may be displayed with an E-book icon for controlling the E-book data.

In some exemplary embodiments, the memory may store E-book data, the first display may be displayed with a first E-book data, and the second display may be displayed with a second E-book data successive to the first E-book data.

In some exemplary embodiments, the touch screen may be displayed with a scroll bar.

In some exemplary embodiments, the mobile terminal may further include a user input unit configured to generate a predetermined input signal, wherein the memory may store E-book data, the first display may be displayed with the E-book data, and the controller may controllably display a part of the first display on the second display, if a selection signal of the part of the first display is inputted.

In some exemplary embodiments, the first display may be displayed with an image file, and the second display may be displayed with an edit icon of the image file.

In some exemplary embodiments, the first display may be displayed with a phone menu, and the second display may be displayed with a functional icon of the phone menu.

In some exemplary embodiments, the first display may be displayed with a phonebook list and the second display may be displayed with a functional icon of the phonebook list.

In some exemplary embodiments, the first display may be displayed with a text message, and the second display may be displayed with a functional icon of the text message.

In some exemplary embodiments, the first display may be further disposed at a lateral surface thereof with a lateral touch input unit including at least one of a parallel arranged plurality of touch sensors or touch strips.

In some exemplary embodiments, the lateral touch input unit may be capable of receiving a flick touch input.

In some exemplary embodiments, the memory may be stored with the E-book data, the first display may be displayed with the E-book data, and the controller may scroll the displayed E-book data if the lateral touch input unit generates a scroll command of the E-book data.

In some exemplary embodiments, the memory may be stored with the E-book data, the first display may be displayed with the E-book data, and the controller may controllably display an E-book data of a selected area on the second display if a selection signal of a part of the E-book data is generated from the lateral touch input unit.

In some exemplary embodiments, the second display may be displayed with a second E-book data successive to a first E-book data, and the controller may controllably cause the first and second E-book data successively displayed on the first display and the second display to be scrolled during input of the scroll command.

In some exemplary embodiments, the first display may be displayed with a phonebook list, and the controller may controllably cause a selected phonebook item to be displayed on the second display if at least one of selection signals in the phonebook list is inputted through the lateral touch input unit.

In some exemplary embodiments, the mobile terminal may further include an illuminance sensor, wherein the controller may controllably change a mode of the mobile terminal to a night mode if an illuminance less than a predetermined brightness is detected by the illuminance sensor.

In some exemplary embodiments, the memory may store a night mode-related data and may further include a user input unit for setting up the night mode, and the controller may controllably change a mode of the mobile terminal to a night mode if a condition set up by the user input unit is met.

In some exemplary embodiments, the first display may be a monochrome display and the second display may be a color display.

In another general aspect of the present disclosure, a mobile terminal comprising: a first display configured to be mounted on the mobile terminal and made of non-radiative electronic paper; a second display configured to be disposed at one side of the first display and made of a light emitting part; a memory configured to store a predetermined menu; and a controller configured to controllably display a part of the menu on the second display if a selection signal of the part of the menu is generated during display of the menu on the first display.

In still another general aspect of the present disclosure, a method for controlling a mobile terminal comprises: providing a mobile terminal mounted with a first display made of electronic paper and a second display made of a light emitting display; determining, by an illuminance sensor, whether a surrounding has an illuminance value less than a predetermined illuminance value; and changing a mode of the mobile terminal to a night mode if it is determined that the surrounding has an illuminance value less than a predetermined illuminance value.

In still further general aspect of the present disclosure, a method for controlling a mobile terminal comprises: providing a mobile terminal mounted with a first display made of electronic paper and a second display made of a light emitting display; performing a set-up of a night mode through a user input unit of the mobile terminal; and changing a mode of the mobile terminal to a night mode if the night mode is set up.

The mobile terminal according to the present disclosure thus configured can provide a mobile terminal having a beautiful exterior look and capable of reducing power consumption and recognizing a data displayed on the electronic paper even if a surrounding is in a dark situation.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 1 is a block diagram of a mobile terminal according to an exemplary embodiment of the present disclosure;

FIG. 8 is a front view of a mobile terminal according to an exemplary embodiment of the present disclosure;

FIGS. 9A to 9H are schematic views illustrating a method for operating a menu in a mobile terminal according to an exemplary embodiment of the present disclosure;

DETAILED DESCRIPTION

Figure 2A:
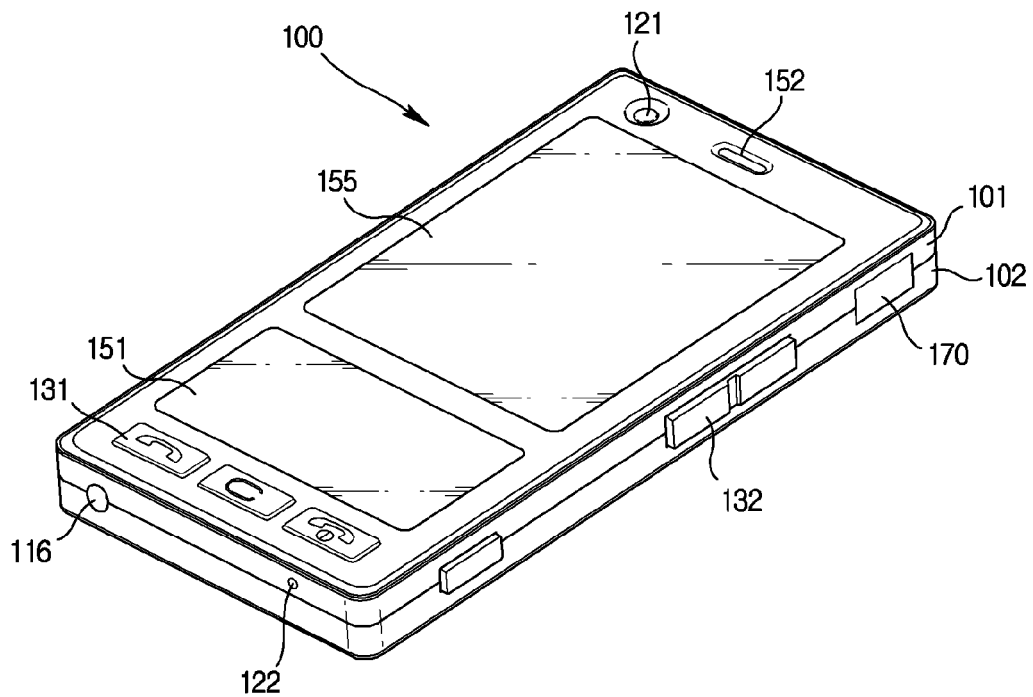
FIG. 2A is a front perspective view of a mobile terminal according to an exemplary embodiment of the present disclosure.

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Embodiments of the present disclosure may be applicable to various types of terminals. Examples of such terminals may include mobile terminals as well as stationary terminals, such as mobile phones, user equipment, smart phones, DTV, computers, digital broadcast terminals, personal digital assistants, portable multimedia players (PMP) and/or navigators.

A further description may be provided with regard to a mobile terminal, although such teachings may equally be applied to other types of terminals including stationary terminals such as digital televisions, desktop computers and the like, the teaching of which is also easily conceived by skilled in the art.

FIG. 1 is a block diagram of a mobile terminal in accordance with an example embodiment. Other embodiments and arrangements may also be provided. FIG. 1 shows a mobile terminal 100 having various components, although other components may also be used. More or less components may alternatively be implemented.

FIG. 1 shows that the mobile terminal 100 includes a wireless communication unit 110, an audio/video (A/V) input unit 120, a user input unit 130, a sensing unit 140, an output unit 150, a memory 160, an interface unit 170, a controller 180 and a power supply 190.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115. The wireless communication unit 110 may include one or more components that permit wireless communication between the mobile terminal 100 and a wireless communication system or a network within which the mobile terminal 100 is located.

In case of non-mobile terminals, the wireless communication unit 110 may be replaced with a wire communication unit. The wireless communication unit 110 and the wire communication unit may be commonly referred to as a communication unit.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the mobile terminal 100 to pursue simultaneous reception of at least two broadcast channels or facilitation of broadcast channel switching.

Examples of broadcast associated information may include information associated with a broadcast channel, a broadcast program, a broadcast service provider, etc. For example, broadcast associated information may include an electronic program guide (EPG) of digital multimedia broadcasting (DMB) and an electronic service guide (ESG) of digital video broadcast-handheld (DVB-H).

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The receiving of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN)(Wi-Fi), Wibro (Wireless broadband), Wimax (World Interoperability for Microwave Access), and/or HSDPA (High Speed Downlink Packet Access). The wireless Internet module 113 may be replaced with a wire Internet module in non-mobile terminals. The wireless Internet module 113 and the wire Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the mobile terminal 100. The position-location module 115 may be provided using global positioning system (GPS) components that cooperate with associated satellites, network components, and/or combinations thereof.

The position-location module 115 may precisely calculate current 3-dimensional position information based on longitude, latitude and altitude by calculating distance information and precise time information from at least three satellites and then by applying triangulation to the calculated information. Location and time information may be calculated using three satellites, and errors of the calculated location position and time information may then be amended or changed using another satellite. The position-location module 115 may calculate speed information by continuously calculating a real-time current location.

The audio/video (A/V) input unit 120 may provide audio or video signal input to the mobile terminal 100. The A/V input unit 120 may include a camera 121 and a microphone 122. The camera 121 may receive and process image frames of still pictures and/or video.

The microphone 122 may receive an external audio signal while the mobile terminal is in a particular mode, such as a phone call mode, a recording mode and/or a voice recognition mode. The received audio signal may then be processed and converted into digital data.

The mobile terminal 100, and in particular the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch.

A specific example is one in which the user input unit 130 is configured as a touch strip 136 arranged at least one of the lateral surface of the display 151 and electronic paper, as will be described below.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and/or an orientation or acceleration/deceleration of the mobile terminal 100, and an ambient illuminance of the mobile terminal.

The mobile terminal 100 may be configured as a slide-type mobile terminal. In such a configuration, the sensing unit 140 may sense whether a sliding portion of the mobile terminal 100 is open or closed. The sensing unit 140 may also sense presence or absence of power provided by the power supply 190, presence or absence of a coupling or other connection between the interface unit 170 and an external device, etc.

The sensing unit 140 may include a proximity sensor 141 and an illuminance sensor 142.

The output unit 150 may generate an output relevant to a sight sense, an auditory sense, a tactile sense and/or the like. The output unit 150 may include a display 151, an audio output module 152, an alarm 153, a haptic module 154, electronic paper 155, and/or the like.

The display 151 may display (output) information processed by the terminal 100. For example, in case that the terminal is in a call mode, the display 151 may display a user interface (UI) or a graphic user interface (GUI) associated with the call. If the mobile terminal 100 is in a video communication mode or a photograph mode, the display 151 may display a photographed and/or received picture, a UI or a GUI.

The display 151 may include at least one of a liquid crystal display (LCD), a thin film transistor liquid crystal display (TFT LCD), an organic light-emitting diode (OLED), a flexible display, and a 3-dimensional display. The display 151 may be called a light emitting display in light of using an intrinsic light emitting device, which is to distinguish from the electronic paper 155 to be described later.

The display 151 may have a transparent or light-transmissive type configuration to enable an external environment to be seen through. This may be called a transparent display. A transparent OLED (TOLED) may be an example of a transparent display. A backside structure of the display 151 may also have the light-transmissive type configuration. In this configuration, a user may see an object located behind the terminal body through the area occupied by the display 151 of the terminal body.

At least two displays 151 may also be provided. For example, a plurality of displays may be provided on a single face of the terminal 100 by being built in one body or spaced apart from the single face. Alternatively, each of a plurality of displays may be provided on different faces of the terminal 100.

If the display 151 and a sensor for detecting a touch action (hereinafter a touch sensor) are constructed in a mutual-layered structure (hereinafter a touch screen), the display 151 may be used as an input device as well as an output device. For example, the touch sensor may include a touch film, a touch sheet, a touchpad and/or the like.

The touch sensor may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor, signal(s) corresponding to the touch input may be transferred to a touch controller. The touch controller may process the signal(s) and then transfer corresponding data to the controller 180. The controller 180 may therefore know which portion of the display 151 is touched.

FIG. 1 shows that the proximity sensor 141 can be provided within the mobile terminal 100 enclosed by the touch screen or around the touch screen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have a longer durability than the contact type sensor and may also have a greater usage than the contact type sensor.

The proximity sensor 141 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and/or the like. If the touch screen is an electrostatic type, the proximity sensor 141 may detect proximity of a pointer using a variation of an electric field according to the proximity of the pointer. In this case, the touch screen (touch sensor) may be classified into the proximity sensor.

For convenience sake, an action in which a pointer approaches the touch screen without contacting the touch screen may be called a proximity touch. An action in which a pointer actually touches the touch screen may be called a contact touch. The location of the touch screen proximity-touched by the pointer may be the position of the pointer that vertically opposes the touch screen when the pointer performs the proximity touch.

The proximity sensor 141 may detect a proximity touch and/or a proximity touch pattern (e.g., a proximity touch distance, a proximity touch duration, a proximity touch position, a proximity touch shift state, etc.). Information corresponding to the detected proximity touch action and/or the detected proximity touch pattern may be outputted to the touch screen.

The audio output module 152 may output audio data that is received from the wireless communication unit 110 in a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm 153 may output a signal for announcing an event occurrence of the mobile terminal 100. An event occurring in the mobile terminal 100 may include one of a call signal reception, a message reception, a key signal input, a touch input and/or the like. The alarm 153 may output a signal for announcing an event occurrence by way of vibration or the like as well as a video signal or an audio signal. The video signal may be outputted via the display 151. The audio signal may be outputted via the audio output module 152. The display 151 or the audio output module 152 may be classified as part of the alarm 153.

The haptic module 154 may bring about various haptic effects that can be sensed by a user. Vibration is a representative example for the haptic effect brought about by the haptic module 154. Strength and pattern of the vibration generated from the haptic module 154 may be controllable. For example, vibrations differing from each other may be outputted in a manner of being synthesized together or may be sequentially outputted.

The haptic module 154 may generate various haptic effects including a vibration, an effect caused by such a stimulus as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the mobile terminal 100.

The electronic paper 155 is a display device applied with features of the conventional ink to paper, and may be called an e-paper. Unlike the conventional flat display using a backlight to allow a pixel to illuminate, the electronic paper employs a reflective light like the conventional paper. Therefore, letters and pictures may be displayed without consuming a power after the picture is changed. Furthermore, the electronic paper may be folded or unfolded unlike the flat display. The electronic paper will be described later.

The memory 160 may store a program for operations of the controller 180. The memory 160 may temporarily store input/ output data (e.g., phonebook, message, still picture, moving picture, etc.). The memory 160 may store the use frequency (e.g., use frequency of each phone number, each message and each multimedia). The memory 160 may store data of vibration and sound in various patterns outputted in case of a touch input to the touch screen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The mobile terminal 100 may operate in association with a web storage that performs a storage function of the memory 160 in the Internet.

The interface unit 170 may play a role as a passage to external devices connected to the mobile terminal 100. The interface unit 170 may receive data from an external device. The interface unit 170 may be supplied with a power and then the power may be delivered to elements within the mobile terminal 100. The interface unit 170 may enable data to be transferred to an external device from an inside of the mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or card that stores various kinds of information for authenticating use of the mobile terminal 100. The identify module may include a user identity module (UIM), a subscriber identity module (SIM), a universal subscriber identity module (USIM) and/or the like. A device provided with the above identity module (hereafter an identity device) may be manufactured in the form of a smart card. The identity device may be connected to the mobile terminal 100 via the port.

The interface unit may play a role as a passage for supplying a power to the mobile terminal 100 from a cradle that is connected to the mobile terminal 100. The interface unit 170 may play a role as a passage for delivering various command signals, which are inputted from the cradle by a user, to the mobile terminal 100. Various command signals inputted from the cradle or the power may work as a signal for recognizing that the mobile terminal 100 is correctly loaded in the cradle.

The controller 180 may control overall operations of the mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separately from the controller 180.

The controller 180 may perform pattern recognizing processing for recognizing a handwriting input performed on the touch screen as a character an/or recognizing a picture drawing input performed on the touch screen as an image.

The power supply 190 may receive an external or internal power and then supply the power required for operations of the respective elements under control of the controller 180.

Embodiments of the present disclosure explained in the following description may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller itself 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

FIG. 2A is a front-perspective view of a mobile terminal according to an example embodiment. Other embodiments, configurations and arrangements may also be provided.

As shown in FIG. 2A, the mobile terminal 100 may include a bar type terminal body. Embodiments of the mobile terminal may be implemented in a variety of different configurations. Examples of such configurations may include a folder-type, a slide-type, a bar-type, a rotational-type, a swing-type and/or combinations thereof.

The body may include a case (casing, housing, cover, etc.) that forms an exterior of the terminal. The case may be divided into a front case 101 and a rear case 102. Various electric/electronic parts may be provided in a space between the front case 101 and the rear case 102. A middle case may be further provided between the front case 101 and the rear case 102.

The cases may be formed by injection molding of synthetic resin or may be formed of metal substance such as stainless steel (STS), titanium (Ti) or the like, for example.

The display 151, the audio output unit 152, the camera 121, user input units 130/131/132, the microphone 122, the interface unit 170 and the like may be provided on the terminal body, and more particularly on the front case 101.

An arrangement of the electronic paper 155 and the display 151 will be described later.

The electronic paper 155 and the display 151 may occupy most of a main face of the front case 101. The audio output module 152 and the camera 121 may be provided at an area adjacent to one end portion of the electronic paper 155, while the user input unit 131 and the microphone 122 may be provided at another area adjacent to the other end portion of the display 151. The user input unit 132 and the interface unit 170 may be provided on lateral sides of the front and rear cases 101 and 102.

The user input unit 130 may receive a command for controlling an operation of the mobile terminal 100. The user input unit 130 may include a plurality of manipulating units 131 and 132. The manipulating units 131 and 132 may be called a manipulating portion and may adopt any mechanism of a tactile manner that enables a user to perform a manipulation action by experiencing a tactile feeling.

Content inputted by the first manipulating unit 131 or the second manipulating unit 132 may be diversely set. For example, a command such as start, end, scroll and/or the like may be inputted to the first manipulating unit 131. A command for a volume adjustment of sound outputted from the audio output unit 152, a command for a switching to a touch recognizing mode of the display 151 or the like may be inputted to the second manipulating unit 132.

Figure 2B:
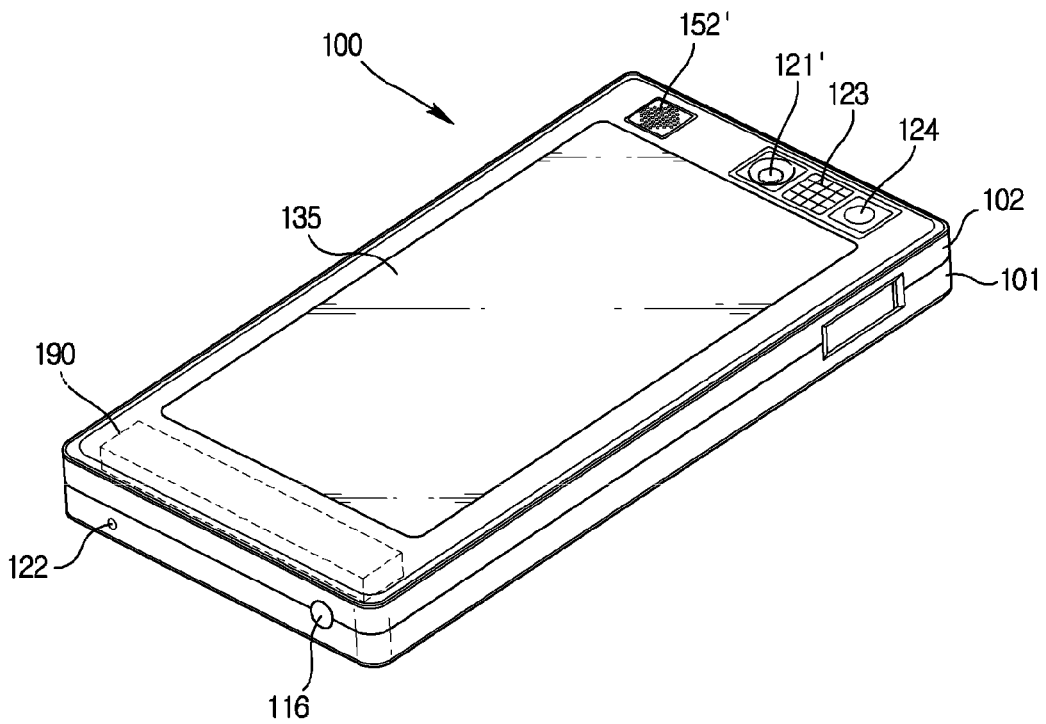
FIG. 2B is a backside perspective view of a mobile terminal according to an exemplary embodiment of the present disclosure.

FIG. 2B is a perspective diagram of a backside of the mobile terminal shown in FIG. 2A. Other embodiments, configurations and arrangements may also be provided.

As shown in FIG. 2B, a camera 121' may be additionally provided on a backside of the terminal body, and more particularly on the rear case 102. The camera 121' may have a photographing direction that is substantially opposite to a photographing direction of the camera 121 (shown in FIG. 2A) and may have pixels different from pixels of the camera 121.

For example, the camera 121 may have a lower number of pixels to capture and transmit a picture of user's face for a video call, while the camera 121' may have a greater number of pixels for capturing a general subject for photography without transmitting the captured subject. Each of the cameras 121 and 121' may be installed on the terminal body to be rotated and/or popped up.

A flash 123 and a mirror 124 may be additionally provided adjacent to the camera 121'. The flash 123 may project light toward a subject in case of photographing the subject using the camera 121'. If a user attempts to take a picture of the user (self-photography) using the camera 121', the mirror 124 may enable the user to view a user's face reflected by the mirror 124.

An additional audio output unit 152' may be provided on the backside of the terminal body. The additional audio output unit 152' may implement a stereo function together with the audio output unit 152 shown in FIG. 2A and may be used for implementation of a speakerphone mode in talking over the terminal.

A broadcast signal receiving antenna 124 may be additionally provided at the lateral side of the terminal body as well as an antenna for communication or the like. The antenna 124 may be considered a portion of the broadcast receiving module 111 shown in FIG. 1 and may be retractably provided on the terminal body.

The power supply 190 for supplying a power to the mobile terminal 100 may be provided to the terminal body. The power supply 190 may be built within the terminal body. Alternatively, the power supply 190 may be attachable to or detachable from the terminal body, from outside of the terminal body.

FIG. 2B also shows a touchpad 135 for detecting a touch that is additionally provided on the rear case 102. The touchpad 135 may be configured in a light transmissive type like the display 151. If the display 151 outputs visual information from both faces, the display 151 may recognize visual information via the touchpad 135 as well. The information outputted from both of the faces may be controlled by the touchpad 135. Alternatively, a display may be further provided to the touchpad 135 so that a touch screen may also be provided to the rear case 102.

The touchpad 135 may be activated by interconnecting with the display 151 of the front case 101. The touchpad 135 may be provided in rear of the display 151 in parallel to one another. The touchpad 135 may have a size equal to or smaller than a size of the display 151.

In the following description, a method for an interconnecting operation between the display 151 and the touch pad 135 will be will be explained, referring to the accompanying FIGS. 3 and 4.

Figure 3A:
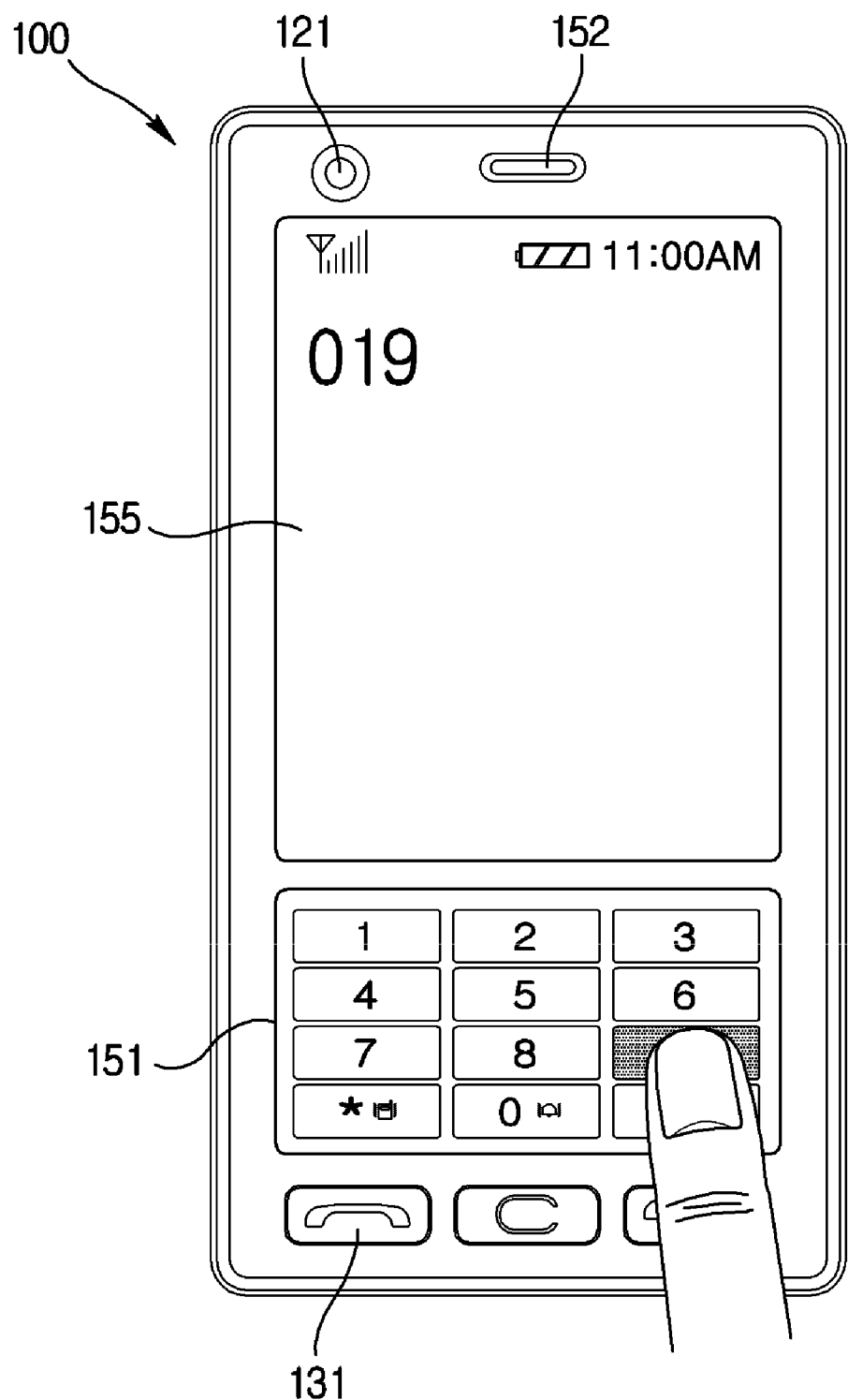
FIGS. 3A and 3B are front views illustrating an operation state of a mobile terminal according to the present disclosure.
Figure 3B:
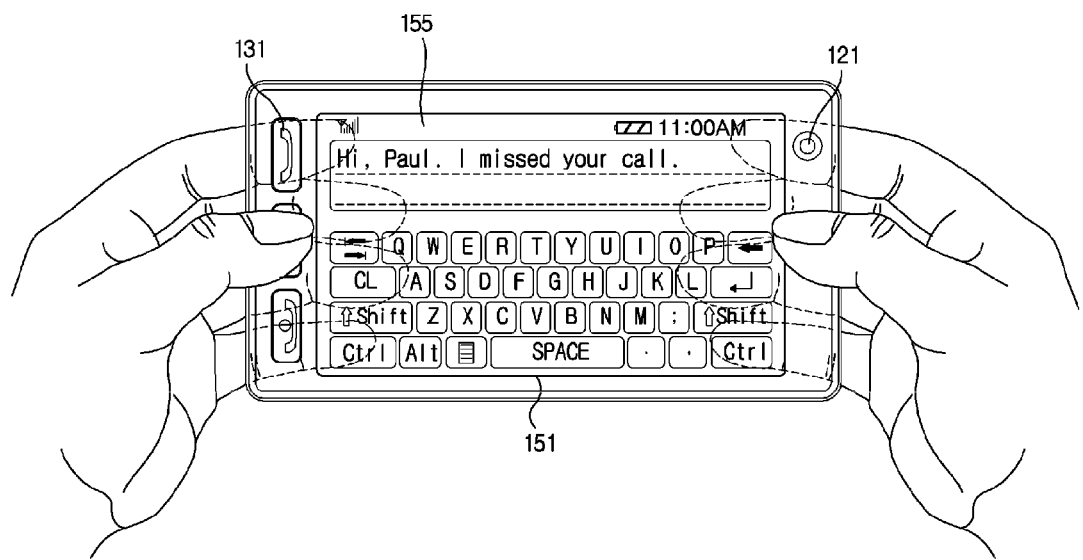

FIGS. 3A and 3B are front views illustrating an operation state of a mobile terminal according to the present disclosure.

The electronic paper 155 may be displayed with various kinds of visual information. The information may be displayed in the form of a letter, a number, a symbol, a graphic, or an icon. In order to input the information, at least one of the letter, the number, the symbol, the graphic, and the icon may be displayed in a predetermined array and may be implemented in the form of a keypad. The keypad may be called a "soft key."

FIG. 3A illustrates reception of a touch applied to the soft key through a front surface of the terminal body.

The display 151 which is a touch screen is displayed with a virtual keypad (which is a soft key) displayed with numbers for inputting phone numbers. In a case the soft key is touched, a number corresponding to the touched soft key is displayed on the electronic paper 155. In a case the first manipulating unit 131 is manipulated to attempt for a call connection with the phone number displayed on the electronic paper 155.

FIG. 3B illustrates reception of a touch applied to the soft key through a rear surface of the terminal body.

If FIG. 3A has illustrated the terminal body in a vertical manner (portrait), FIG. 3B has illustrated the terminal body in a horizontal manner (landscape). The display 151 may be so implemented as to allow an output screen to be changed according to an arranged direction of the terminal body.

FIG. 3B illustrates a text input mode that is being operated in the mobile terminal. The front face of the mobile terminal 100 may be provided with the electronic paper 155 and the display 151. The display 151 may be provided with a soft key displayed with at least one of the letters, symbols and numbers. The soft key may be provided in the arrangement of QWERTY keys.

In a case the soft keys are touched through the touch pad 135 (see FIG. 2B), a letter, a number and a symbol corresponding to the touched soft key may be displayed on the electronic paper 155. The touch input through the touch pad 135 has an advantage over the touch input through the display 151 in that the soft key is prevented from being hidden by a finger during the touch.

In a case the display 151 and the touch pad 135 are transparently formed, fingers positioned at the rear face of the terminal body can be checked by the naked eye to thereby facilitate a more precise touch input.

In addition to the input method disclosed in the aforementioned exemplary embodiments, the display 151 or the touch pad 135 may be implemented by touch input of a scroll. The scroll of the display 151 or the touch pad 135 by a user may move a cursor or a pointer positioned on an object displayed on the display 151, for example, on an icon.

To cope with a case where the display 151 (touch screen) and the touch pad 135 are simultaneously touched within a predetermined time scope, a function of the mobile terminal may be implemented. The simultaneous touch may be a case where the user uses a thumb and an index finger to clamp the terminal body. The said one function of the mobile terminal may, for example, be activation or deactivation of the display 151 or the touch pad 135.

The proximity sensor 141 illustrated in FIG. 1 will be explained in more detail with reference to FIG. 4.

Figure 4:
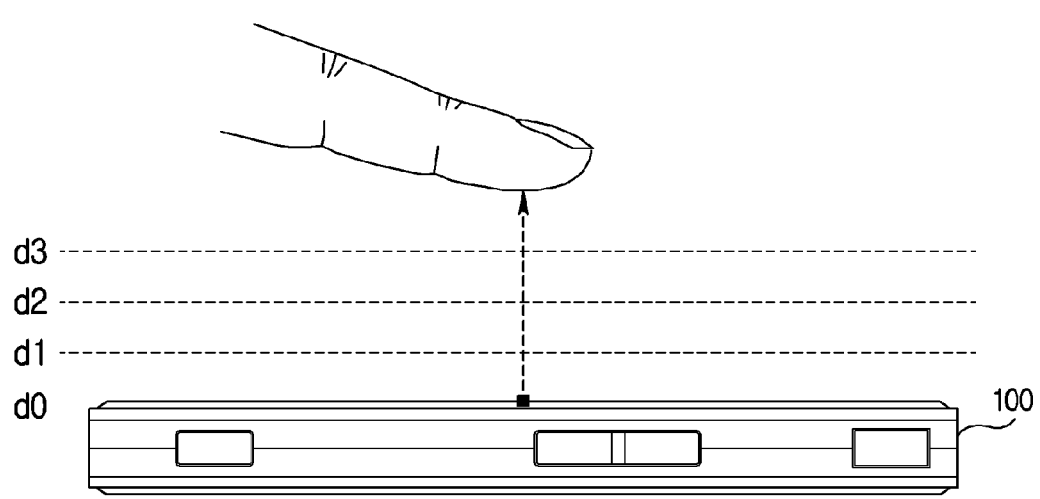
FIG. 4 is a conceptual view illustrating a proximity depth of proximity sensor.

FIG. 4 is a conceptual view illustrating a proximity depth of proximity sensor.

Referring to FIG. 4, in a case a pointer such as a user finger or a pen approaches the touch screen, the proximity sensor 141 provided inside or in the vicinity of the touch screen may detect the approach to output a proximity signal.

The proximity sensor 141 may be so configured as to output different proximity signals according to a distance (hereinafter referred to as "proximity depth") between the proximity-touched pointer and the touch screen.

FIG. 4 exemplifies a cross-sectional view of a touch screen provided with a proximity sensor capable of detecting 3 proximity depths, for example. It should be apparent that a proximity sensor capable of detecting less than 3 or more than 4 proximity depths may be provided.

To be more specific, if the pointer completely contacts the touch screen (d0), the proximity sensor may identify the touch as a contact touch. If the pointer is positioned on the touch screen at a position distanced from less than a distance (d1), the proximity sensor may identify the touch as a proximity touch of a first proximity depth. If the pointer is positioned on the touch screen at a position distanced more than a distance (d1) but less than a distance (d2), the proximity sensor may identify the touch as a proximity touch of a second proximity depth. If the pointer is positioned on the touch screen at a position distanced more than a distance (d2) but less than a distance (d3), the proximity sensor may identify the touch as a proximity touch of a third proximity depth. If the pointer is positioned on the touch screen at a position distanced more than a distance (d3), the proximity sensor may identify the proximity touch as being released.

Therefore, the controller 180 may identify the proximity touch in various input signals in response to the proximity depth and proximity position of the pointer, and perform various operating controls in response to the various input signals.

Figure 5:
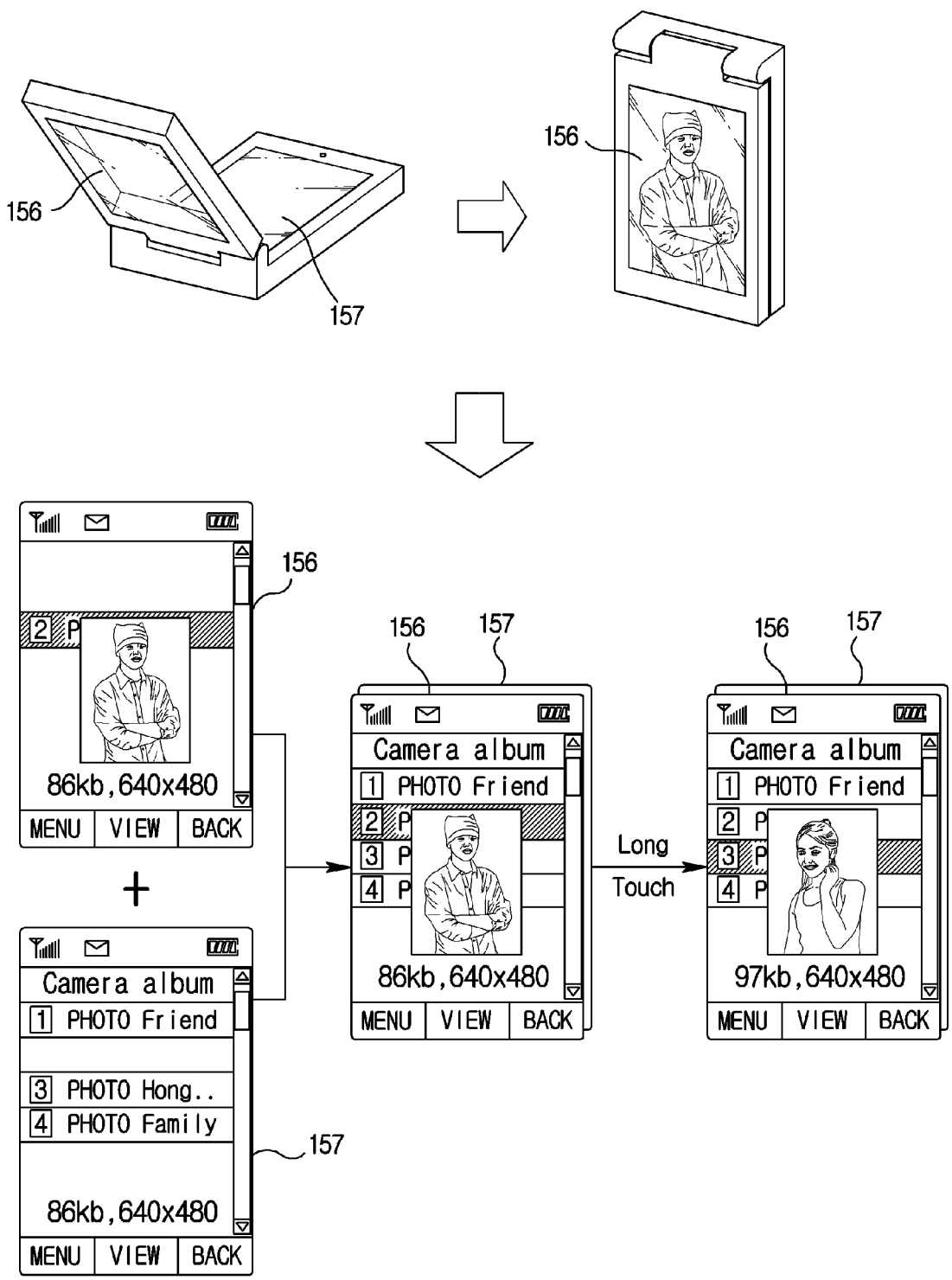
FIG. 5 is a conceptual view illustrating a method for controlling a touch operation of a pair of displays being overlapped.

FIG. 5 is a conceptual view illustrating a method for controlling a touch operation of a pair of displays (156, 157) being overlapped.

The mobile terminal disclosed in FIG. 5 is a folder type terminal in which a folder unit can be connectively folded to the terminal body.

A first display 156 provided on the folder unit may be a transmissive type or a transparent type such as TOLED, but it is possible that a second display 157 provided on the terminal body may be a non-transmissive type such as an LCD. The first and second displays (156, 157) may be respectively configured to be a touch screen capable of receiving a touch input.

For example, in a case a contact touch or a proximity touch is detected on the first display or the TOLED 156, the controller 180 may select or run at least one image from an image list displayed on the TOLED 156 according to the type of touch or the touch time.

Hereinafter, a method for controlling information displayed on other displays or the LCD 157 according to the touch of the TOLED 156 exposed to the outside in an overlapped manner will be described based on input methods divided into a touch, a long touch, a long touch & drag and the like.

The TOLED 156 in an overlapped manner (closed state of the mobile terminal) is overlappingly provided at a lower side of the LCD 157. Under this state, a touch for controlling an image displayed on the TOLED 156, and touches by other methods are detected, for example, if a long touch (e.g., a touch continued for 2 seconds to more than 3 seconds) is detected, the controller 180 may select at least one image from an image list displayed on the LCD 157 according to the detected touch input. A result according to the implementation of the selected image may be displayed on the TOLED 156.

The long touch may be employed if an object desired from objects displayed on the LCD 157 is selectively moved to the TOLED 156 (without an implementing operation thereof). That is, if the user long-touches an area of the TOLED 156 corresponding to a particular object of the LCD 157, the controller 180 may display the corresponding object that is moved to the TOLED 156. Meanwhile, an object displayed on the TOLED 156 may be displayed, being moved to the LCD 157, according to a predetermined touch input to the TOLED 156, for example, a flicking, swirling or the like. FIG. 5 exemplifies a case where a second menu displayed on the LCD 157 is displayed being moved to the TOLED 156.

In a case another input along with the long touch, for example, a drag is additionally detected, the controller 180 may display on the TOLED 156, for example, a preview screen of the image, as a function related to the image selected by the long touch. FIG. 5 illustrates an example where a preview (a man's photo) of the second menu (image file) is executed.

In a case a drag is additionally executed toward another image of the TOLED 156 while the long touch is maintained and the preview screen is outputted, the controller 180 moves a selection cursor (or a selection bar) of the LCD 157 to display an image selected by the selection cursor on the preview screen (a lady's photo). Successively, if the touch (long touch and drag) ends, the controller 180 may display a first image selected by the long touch. The touch operation (long touch and drag) may be applied in the same manner to a case where a slide (operation of a proximity touch corresponding to the drag) is detected along with a long touch (proximity touch continued at least 2 seconds or more than 3 seconds) to the TOLED 156.

In other touch operations than those mentioned above, the controller 180 may operate in the same method as in the conventional touch control method. A control method to a touch operation in the overlapped manner may be applied to a terminal provided with a single display. Furthermore, the control method may be applied to other terminals of folder type provided with a dual display.

Figure 6A:
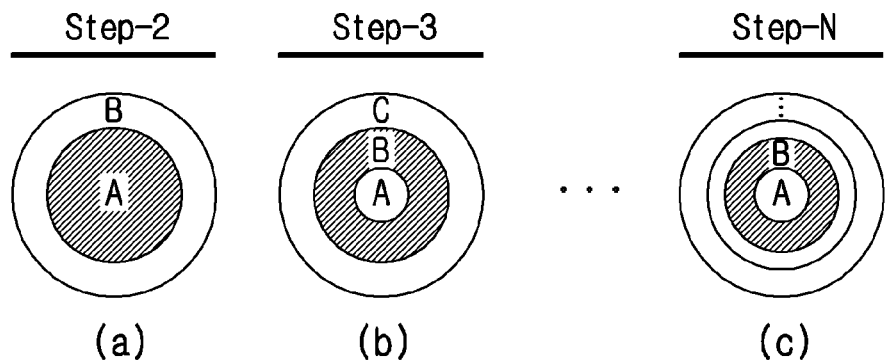
FIGS. 6A and 6B are conceptual views respectively illustrating a proximity touch recognition area from which a proximity signal is generated and a haptic area from which a tactile effect is generated.
Figure 6B:
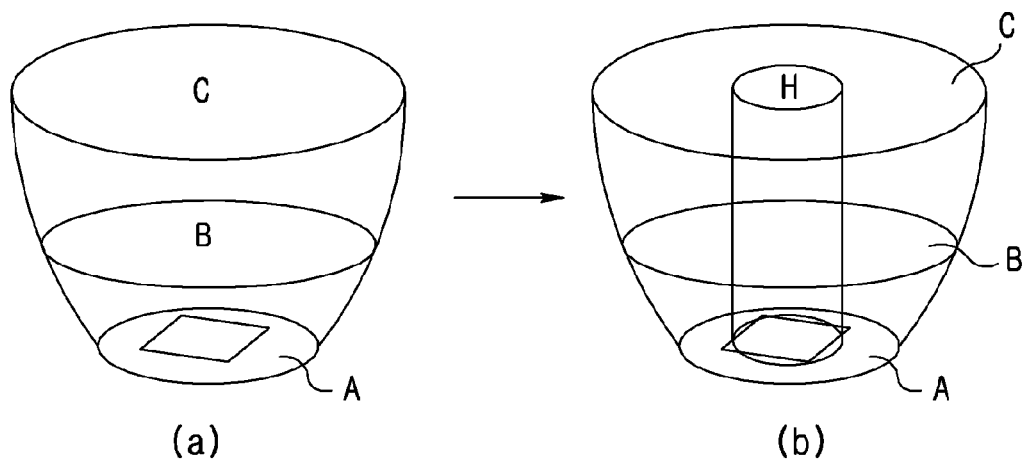

FIGS. 6A and 6B are conceptual views respectively illustrating a proximity touch recognition area from which a proximity signal is generated and a haptic area from which a tactile effect is generated.

FIG. 6A illustrates an object such as an icon or a menu item in a round shape for the convenience sake. An area where an object is displayed on the display 151 may be divided into two areas, i.e., a first area in the center (A) and a second area encompassing the same (B). The first and second areas may be configured to generate tactile effects each having a different intensity or a different pattern. For example, two steps may be configured. For example, in a case the second area (B) is touched, a first vibration is outputted, and in a case the first area (A) is touched, a second vibration greater than the first vibration may be outputted.

In a case a proximity touch recognition area and a haptic area are simultaneously set up on an area where the object is displayed, the haptic area from which a haptic effect is generated and the proximity touch recognition area from which a proximity signal is detected may be differently set up. That is, the haptic area may be set up narrower or wider than the proximity touch recognition area.

For example, referring to FIG. 6A(a), an area including the first area (A) and the second area (B) may be set up as the proximity touch recognition area, and the first area (A) may be set up as the haptic area.

Referring to FIG. 6A(b), an area on which an object is displayed may be divided into 3 areas (A, B, C) or as illustrated in FIG. 6A(c), the area may be divided into N (N>4) number of areas. Each divided area may be configured to generate haptic effects, each of a different intensity or a different pattern. Even if an area on which one object is displayed is divided into 3 or more than 3 areas, the haptic area and the proximity touch recognition area may be differently set up according to use environment.

A proximity touch recognition area may be differently set up according to a proximity depth to the display 151. That is, as illustrated in FIG. 6A(a), the proximity touch recognition area corresponding to a proximity depth to the display 151 may be gradually reduced to 'C', 'B' and 'A', or conversely, the proximity touch recognition area corresponding to a proximity depth to the display 151 may be gradually enlarged. In this case, the haptic area, as illustrated in FIG. 6B(b) on an 'H' area, may be set up at a predetermined size regardless of the proximity depth to the display 151.

If an area on which an object is displayed is divided to set up a haptic area or a proximity touch recognition area, as illustrated in FIG. 6a, various dividing methods may be employed such as a horizontally dividing method, a vertically dividing method, a radially dividing method, or a combination of these methods.

Figure 7:
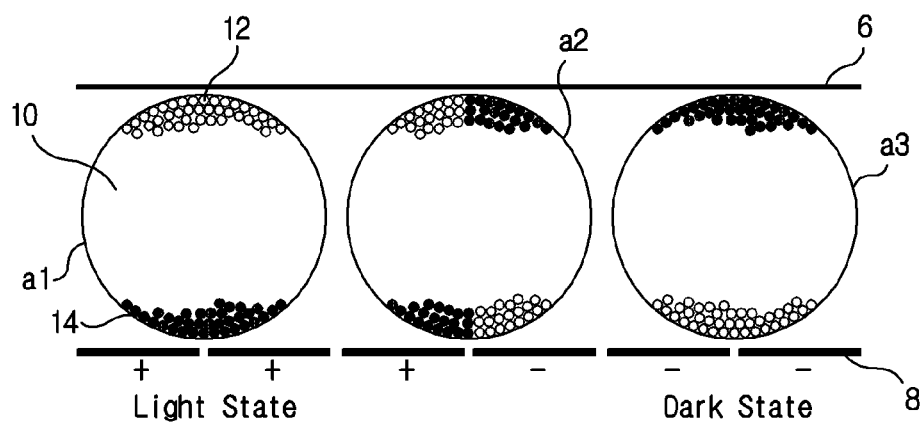
FIG. 7 is a schematic view illustrating an operation principle of electronic paper mounted on a mobile terminal according to an exemplary embodiment of the present disclosure.

FIG. 7 is a schematic view illustrating an operation principle of electronic paper 155 mounted on a mobile terminal according to an exemplary embodiment of the present disclosure.

FIG. 7 illustrates a cross-sectional view of an electronic ink micro capsule (a1, a2, a3). As illustrated, the electronic ink micro capsule may include a top transparent electrode 6, a bottom electrode 8 and an electronic ink capsule 10.

The electronic ink capsule is provided with positive charged white pigment chips 12, and negative charged black pigment chips 14. If the bottom electrode is charged to an anode, the white chips 12 may move to an upper transparent electrode 6 to make the electronic ink capsule white, and conversely if the bottom electrode is charged to a cathode, the black chips 14 may move to the upper transparent electrode 6 to get blackened.

The electronic paper 155 containing lots of electronic ink capsules 10 may function as a display. Furthermore, one ink capsule 10 may show black and white at the same time. In this case, half of pixels in the bottom electrode 8 are charged to an anode, while the other half of pixels are charged to a cathode. As evidenced, the electronic paper 155 is a non-radiative display of a new method. The electronic paper is conventionally a monochrome display but the electronic paper may implement color moving pictures through a combination of a high polymer coating technique and a liquid chemistry. The electronic paper may display a comic strip of 30 frames per second and a documentary movie.

Now, the type of mobile terminal according to the present disclosure will be described with reference to FIG. 8.

FIG. 8 is a front view of a mobile terminal according to an exemplary embodiment of the present disclosure.

As illustrated, a mobile terminal according to the exemplary embodiment of the present disclosure is a bar type mobile terminal, a front face of which is provided with a display 151 (that may include an LCD, an OLED and an LED display and may be called a light emitting display) and an electronic paper 155.

As depicted in FIG. 8(*a*), the light emitting display 151 may be provided at a top lateral surface of the electronic paper 155, or as illustrated in FIG. 8(*b*), the light emitting display 151 may be provided at a bottom lateral surface of the electronic paper 155. The light emitting display 151 may be a touch screen. Also, the light emitting display 151 may be a transparent OLED having a touch screen function. If the light emitting display 151 is a touch screen, the light emitting display 151 may function as an input unit.

FIGS. 8(*c*) and 8(*d*) show that the touch strip 136 is vertically provided on a lateral surface of the mobile terminal. The touch strip 136 may be formed in a thin long touch sensor shape, or a plurality of touch strips may be provided in the form of a plurality of touch sensors in parallel. Alternatively, the touch strip 136 may be provided at a lateral surface of the main face of the mobile terminal. FIG. 8(*c*) shows that the touch strip 136 is formed at a lateral surface of the electronic paper 155 and the display 151, while FIG. 8(*d*) shows that the touch strip 136 is formed only on the lateral surface of the display 151. Now, a menu operating method in a mobile terminal having a shape shown in FIG. 8 will be described.

Hereinafter, menu operating methods in a mobile terminal according to the present disclosure will be described with reference to FIGS. 9 to 13.

Figure 9A:
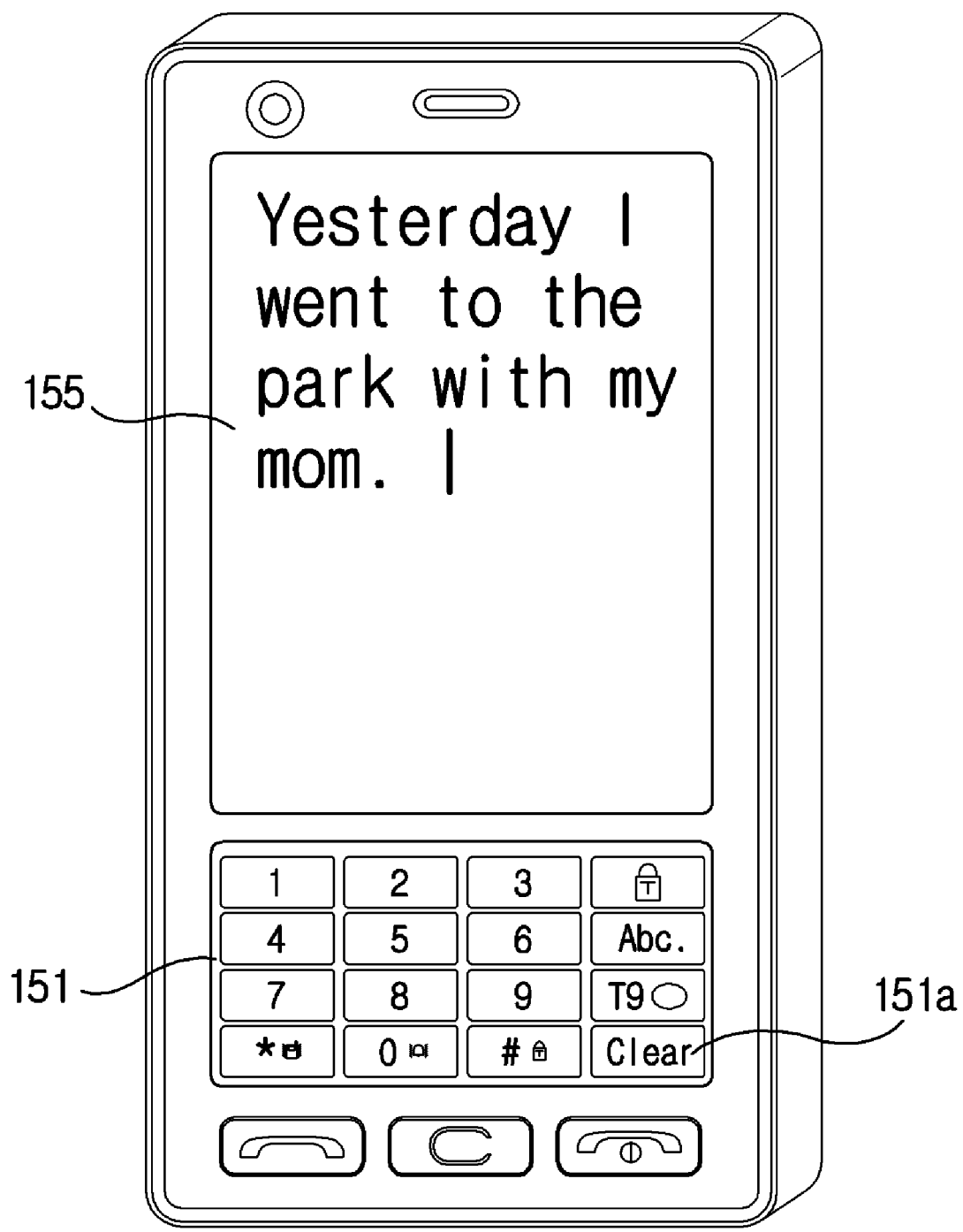
Figure 9C:
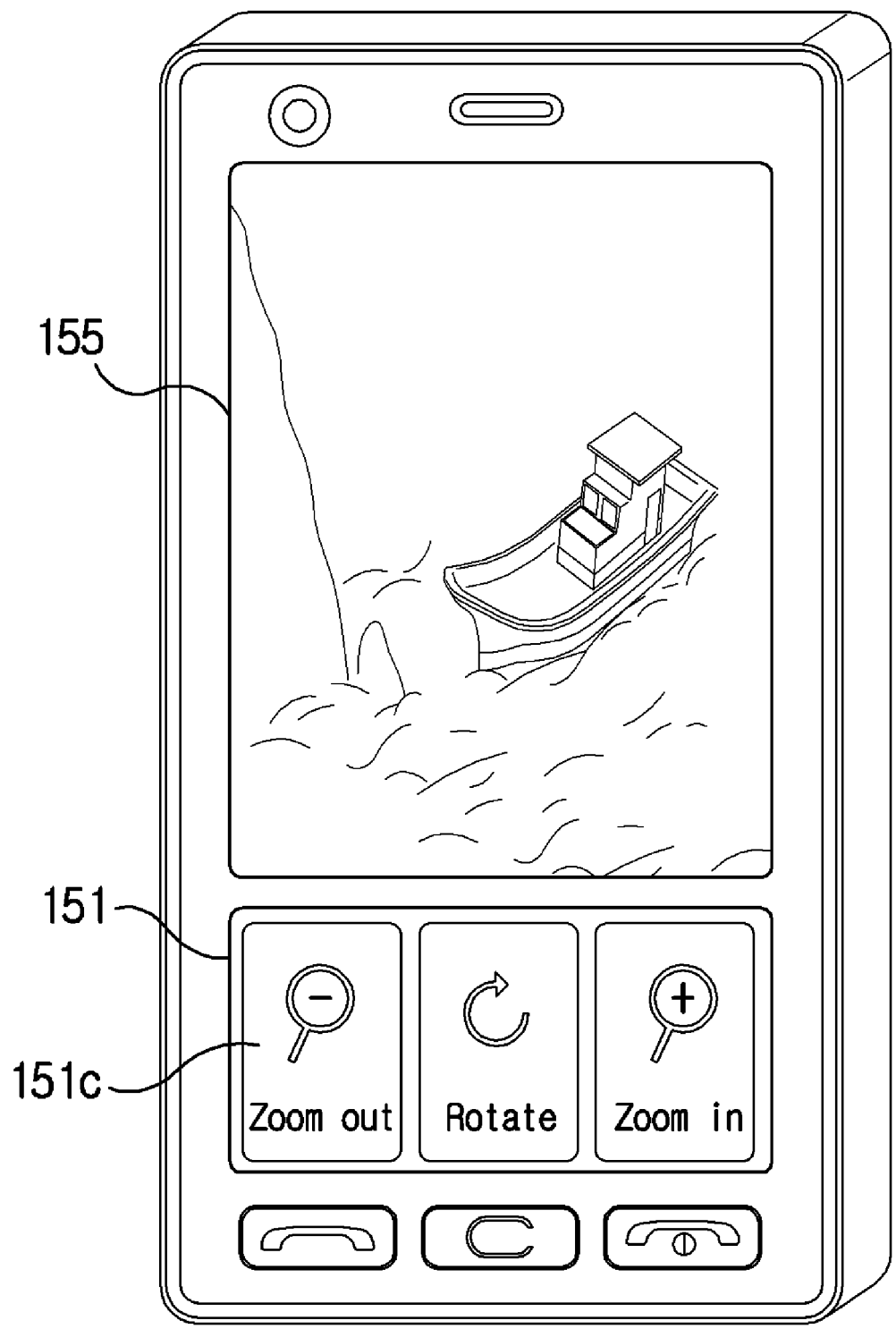
Figure 9D:
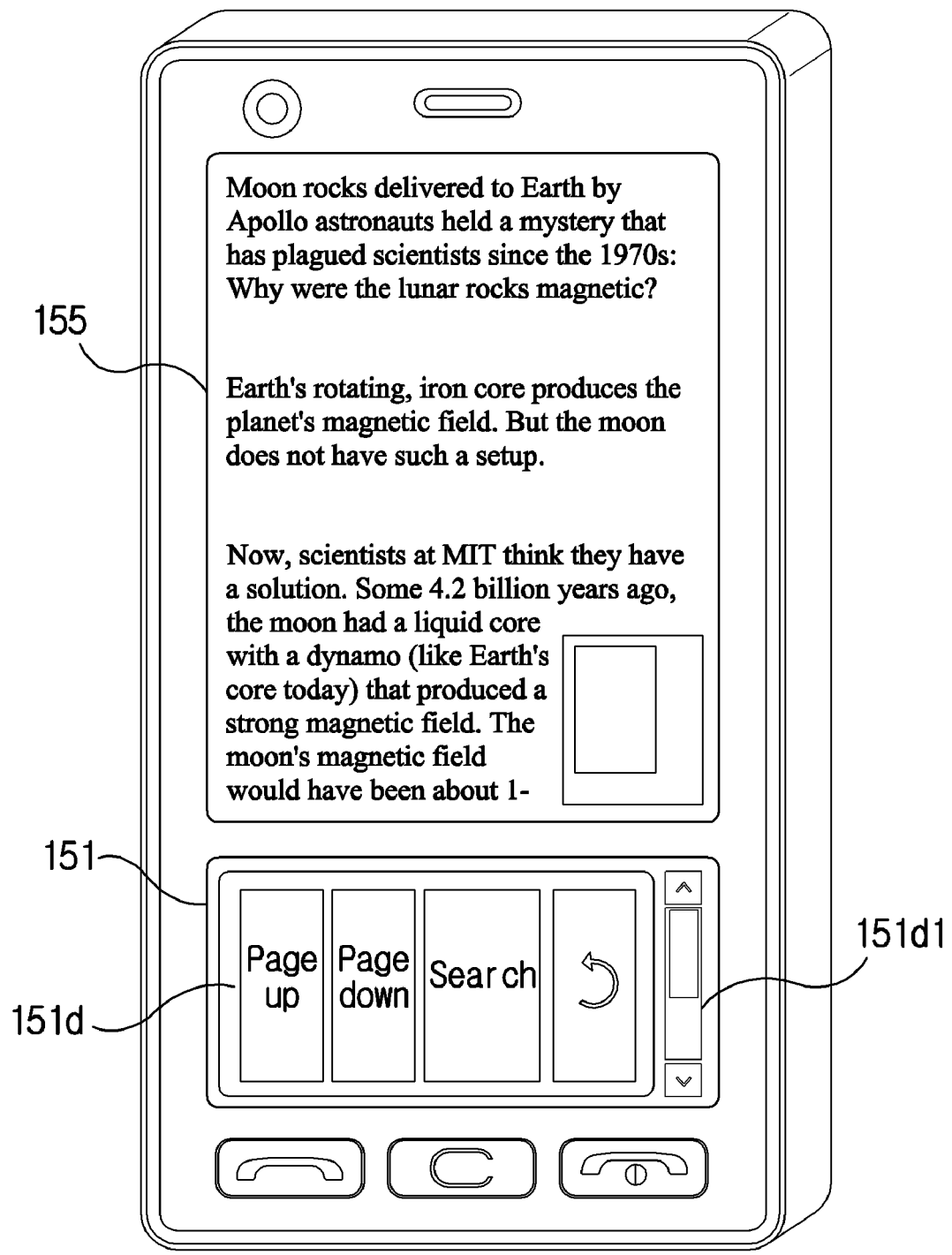
Figure 9E:
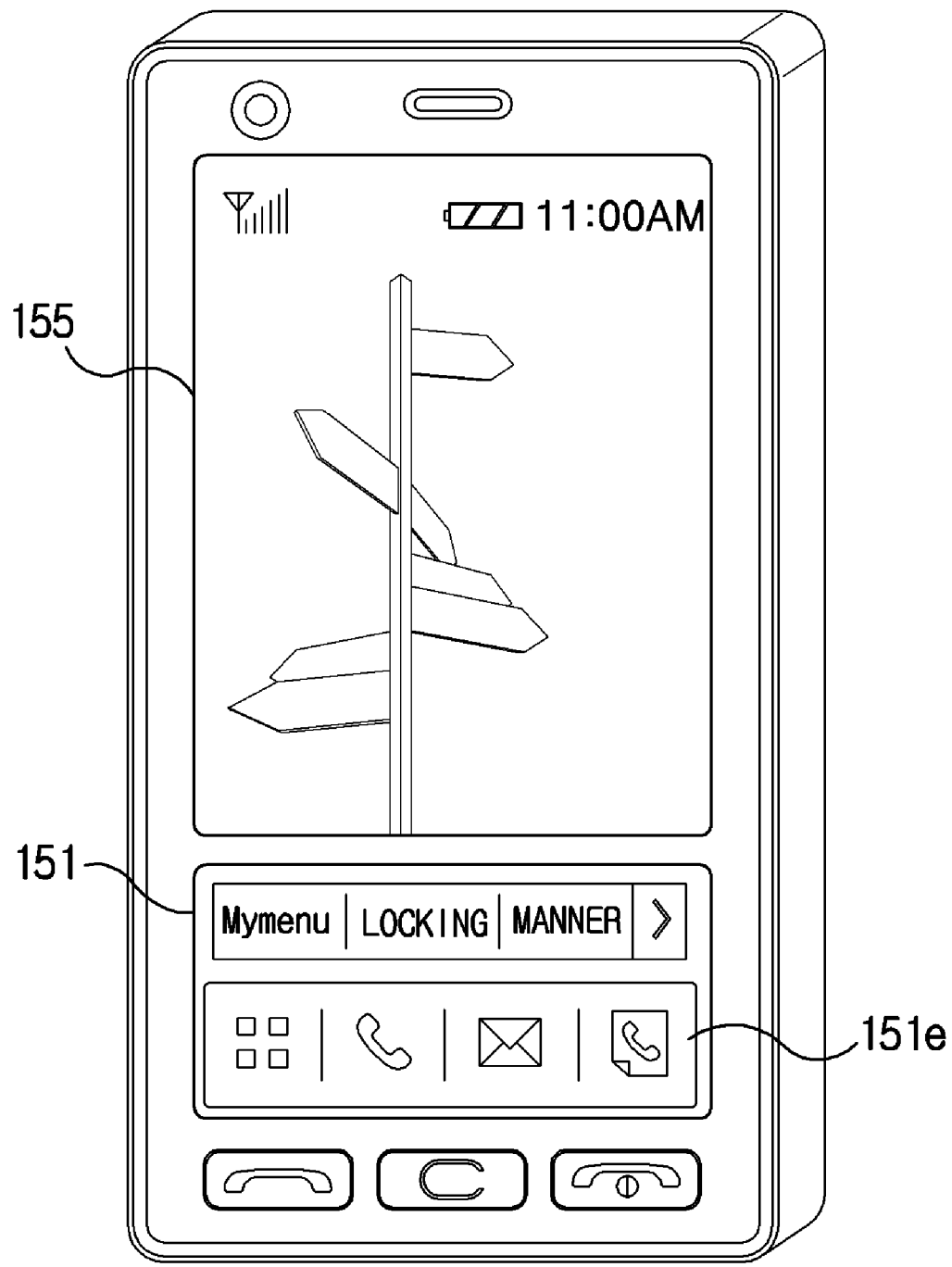
Figure 9F:
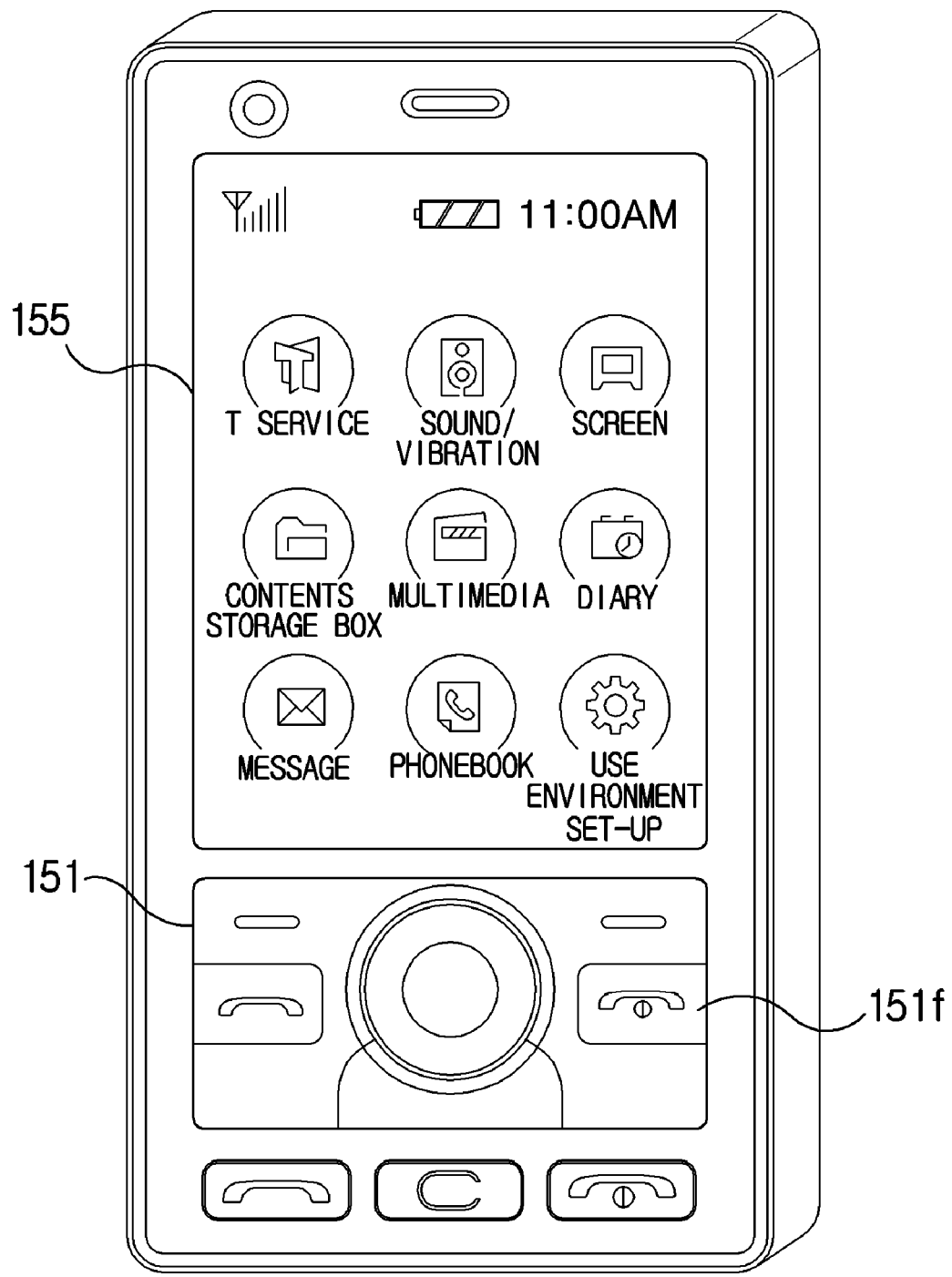
Figure 10:
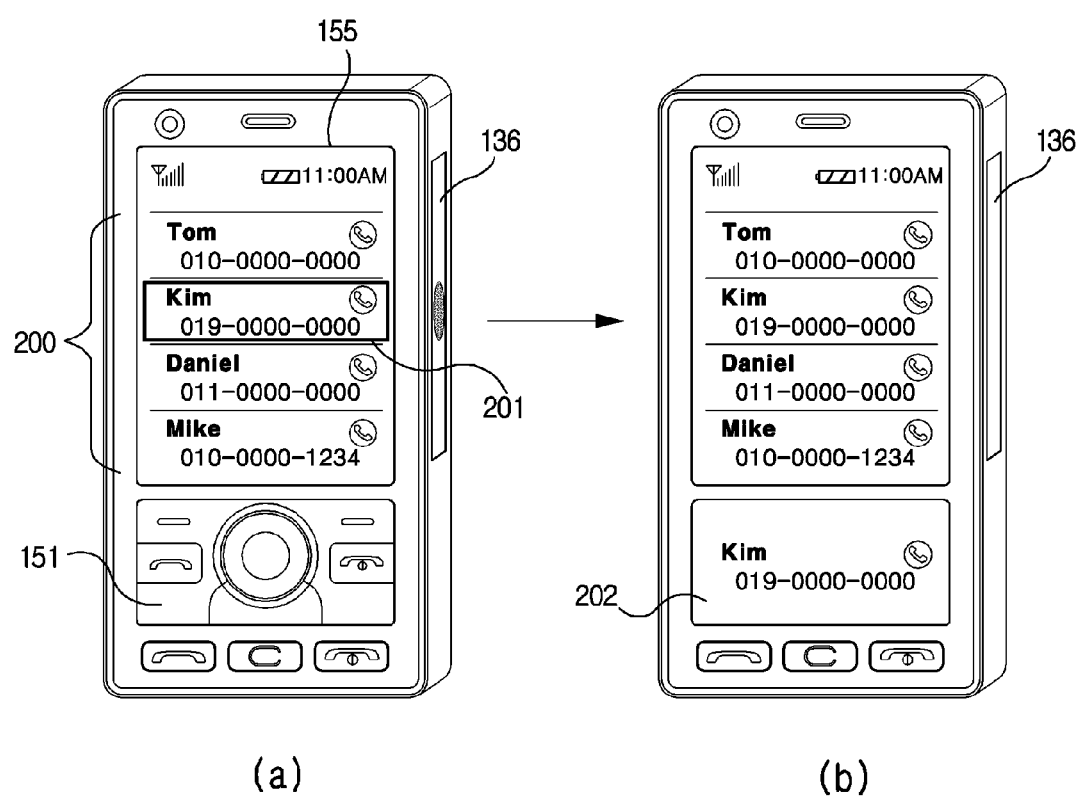
FIG. 10 is a schematic view illustrating a method for operating a phonebook list menu in a mobile terminal mounted with a touch strip according to an exemplary embodiment of the present disclosure.
Figure 11:
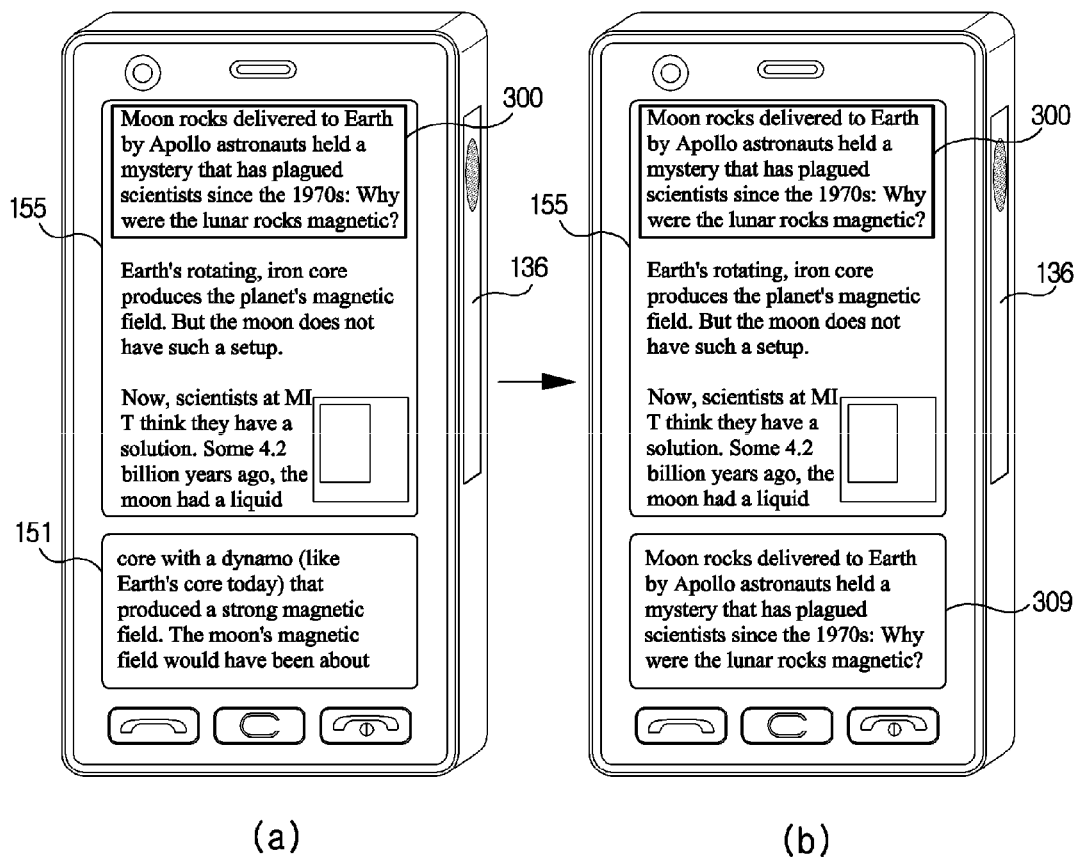
FIG. 11 is a schematic view illustrating a method for operating an E-book in a mobile terminal mounted with a touch strip according to an exemplary embodiment of the present disclosure.
Figure 12:
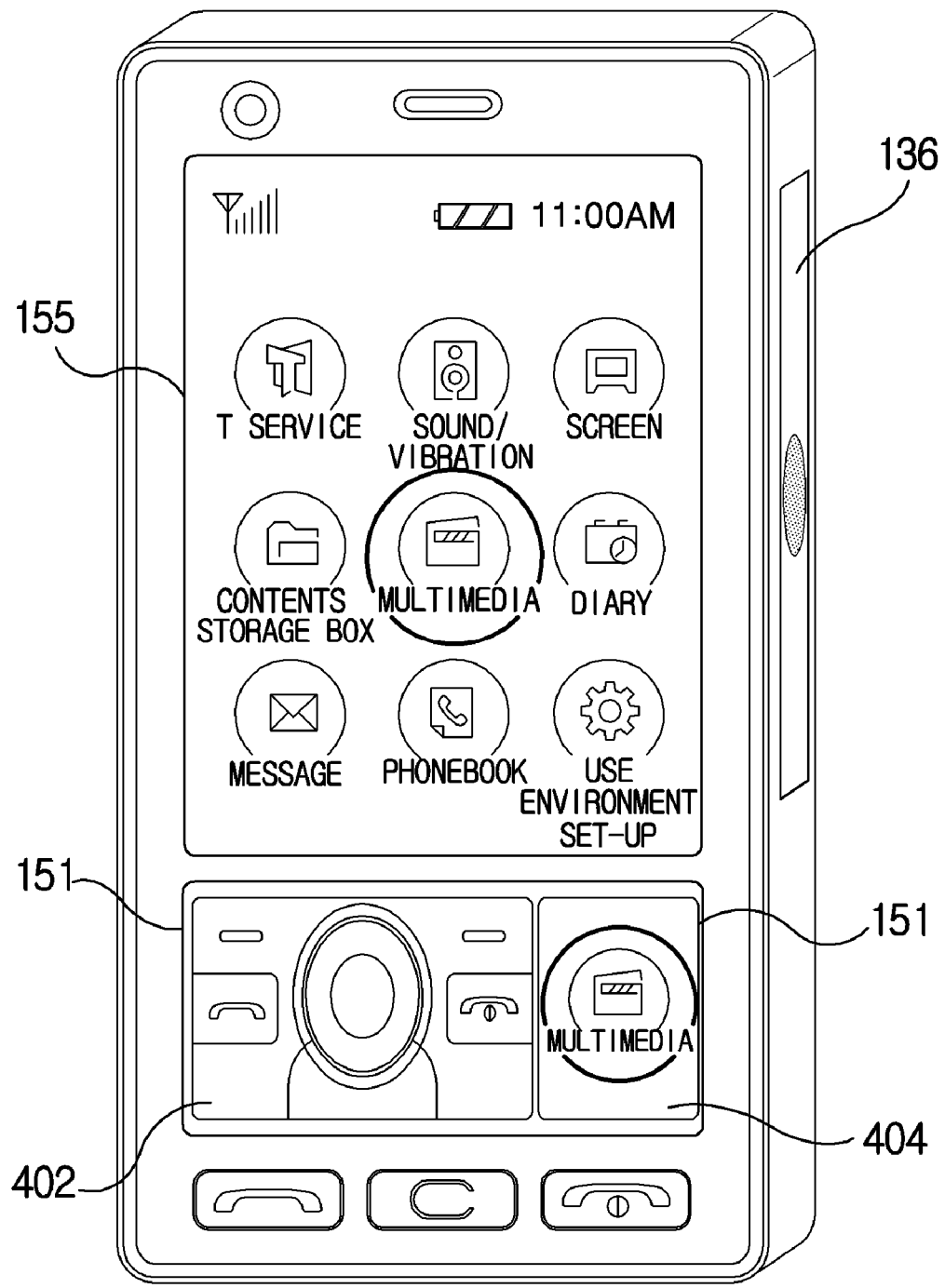
FIG. 12 is a schematic view illustrating a method for operating a menu in a mobile terminal mounted with a touch strip according to an exemplary embodiment of the present disclosure.
Figure 13:
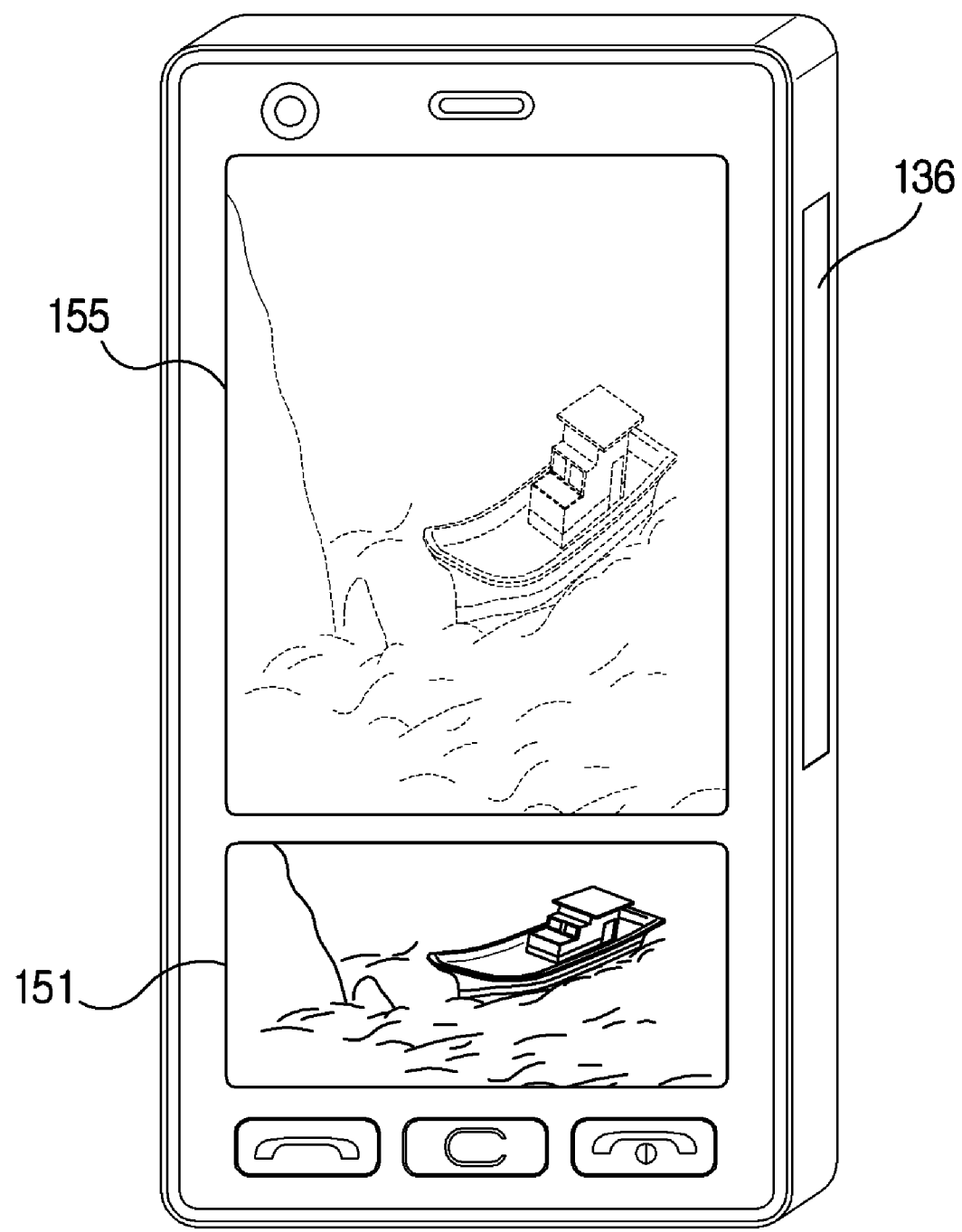
FIG. 13 is a schematic view illustrating a state where an image file is displayed in a mobile terminal according to an exemplary embodiment of the present disclosure.

FIGS. 9*a* to 9*f* are schematic views illustrating a method for operating a menu in a mobile terminal according to an exemplary embodiment of the present disclosure, FIG. 10 is a schematic view illustrating a method for operating a phonebook list menu in a mobile terminal mounted with a touch strip according to an exemplary embodiment of the present disclosure, FIG. 11 is a schematic view illustrating a method for operating an E-book in a mobile terminal mounted with a touch strip according to an exemplary embodiment of the present disclosure, FIG. 12 is a schematic view illustrating a method for operating a menu in a mobile terminal mounted with a touch strip according to an exemplary embodiment of the present disclosure, and FIG. 13 is a schematic view illustrating a state where an image file is displayed in a mobile terminal according to an exemplary embodiment of the present disclosure.

FIG. 9A shows a state in which a text message is prepared in a mobile terminal according to the present disclosure.

As shown in the figure, the display 151 (which is a touch screen) is displayed with virtual keypads 151*a*. The electronic paper 155 is displayed with text messages inputted through the virtual keypads 151*a*. In a case where the virtual keypads 151*a* are displayed on the display 151, text messages may be transmitted, or telephone calls may be conducted without any separate keypads.

FIG. 9B illustrates a state in which text messages are prepared by handwriting input method in a mobile terminal. As depicted, the display 151 (which is a touch screen) is displayed with a handwriting input area 151*b*. In a case a user inputs a handwriting on the handwriting input area 151*b* using a finger or a point device, the controller 180 recognizes it and display on the electronic paper 155. The handwriting input area 151*b* may be also displayed with a functional key 151*b*-1 and a mode key 151*b*-2.

The functional key 151*b*-1 is a key for selecting functions such as text message transmission function, text delete function, call function and the like. The mode key 151*b*-2 is a key for setting up a mode for texts to be inputted. For example, in a case the Korean alphabet is inputted, a Korean alphabet input mode may be set up through the mode key 151*b*-2. Successively, in a case the Korean alphabet is inputted, a text recognition rate may be enhanced.

FIG. 9C illustrates a state in which an image file is displayed in a mobile terminal according to the present disclosure.

As shown in the figure, the electronic paper 155 is displayed with an image file stored in the memory 160, and the light emitting display 151 (which is a touch screen) is displayed with function keys 151*c* capable of editing such as zooming-in, zooming-out and rotation of the image file, correcting and transmitting the image file. The image function keys 151*c* enables predetermined functions of images displayed on the electronic paper 155 to be performed.

FIG. 9D illustrates a state in which an e-book is displayed in a mobile terminal according to the present disclosure.

As depicted in the figure, the electronic paper 155 is displayed with e-book data stored in the memory 160. As mentioned above, the electronic paper 155 has physical properties similar to those of actual paper, such that if e-book data is displayed on the electronic paper 155, a user may feel the same feeling as that of actual book.

The display 151 (which is a touch screen) is displayed with e-book function keys 151d for controlling the e-book displayed on the electronic paper 155 and a scroll bar 151d-1. The user may use the scroll bar 151d-1 to scroll the e-book displayed on the electronic paper 155.

FIG. 9E illustrates a state in which an idle screen is displayed on the electronic paper in a mobile terminal according to the present disclosure.

As shown, the electronic paper 155 is displayed with an idle screen and the display 151 (which is a touch screen) is displayed with idle screen function keys 151e. The idle screen function keys 151e may be displayed with a text message key, a call key, a menu key and a manner mode key.

FIG. 9F illustrates a state in which a phone menu is displayed on the electronic paper in a mobile terminal according to the present disclosure.

As shown, the electronic paper 155 is displayed with phone menus and the display 151 (which is a touch screen) is displayed with a navigation key 151f. In a case the user may use the navigation key 151f to select one of the phone menus displayed on the electronic paper 155.

Figure 9G:
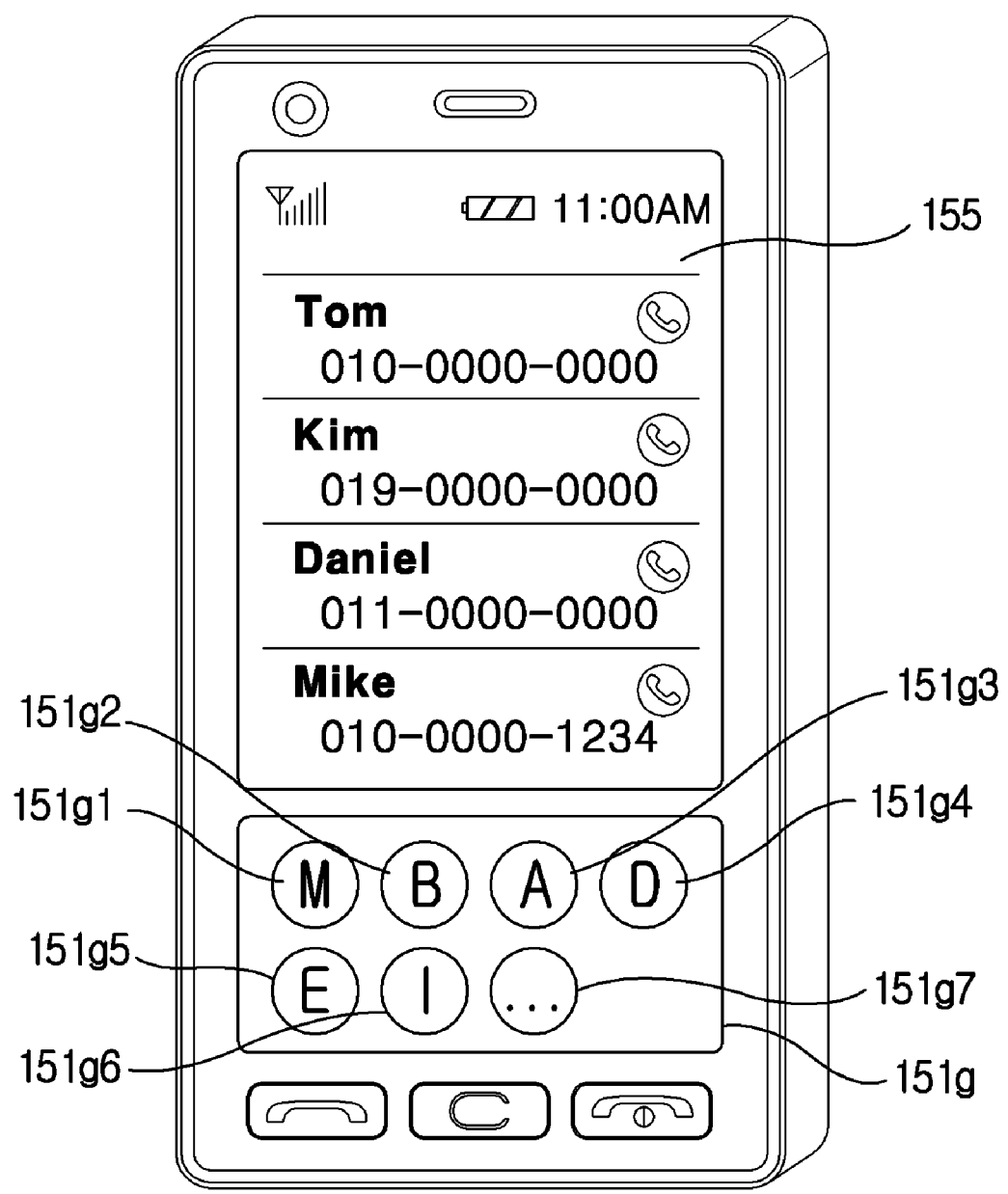

FIG. 9G shows a state in which a phonebook list is displayed on the electronic paper 155 in a mobile terminal according to the present disclosure.

As shown, the electronic paper 155 is displayed with a phonebook list and the display 151 (which is a touch screen) is displayed with phonebook function keys 151g. The phonebook function keys 151g may include a message send key 151g-1, a Bluetooth send key 151g-2, a new number registration key 151g-3, a delete function key 151g-4, an edit function key 151g-5 and a detail view function key 151g-6. In the present embodiment, display of the phonebook function key 151g on the display 151 may provide the user with a convenient UI.

Figure 9H:
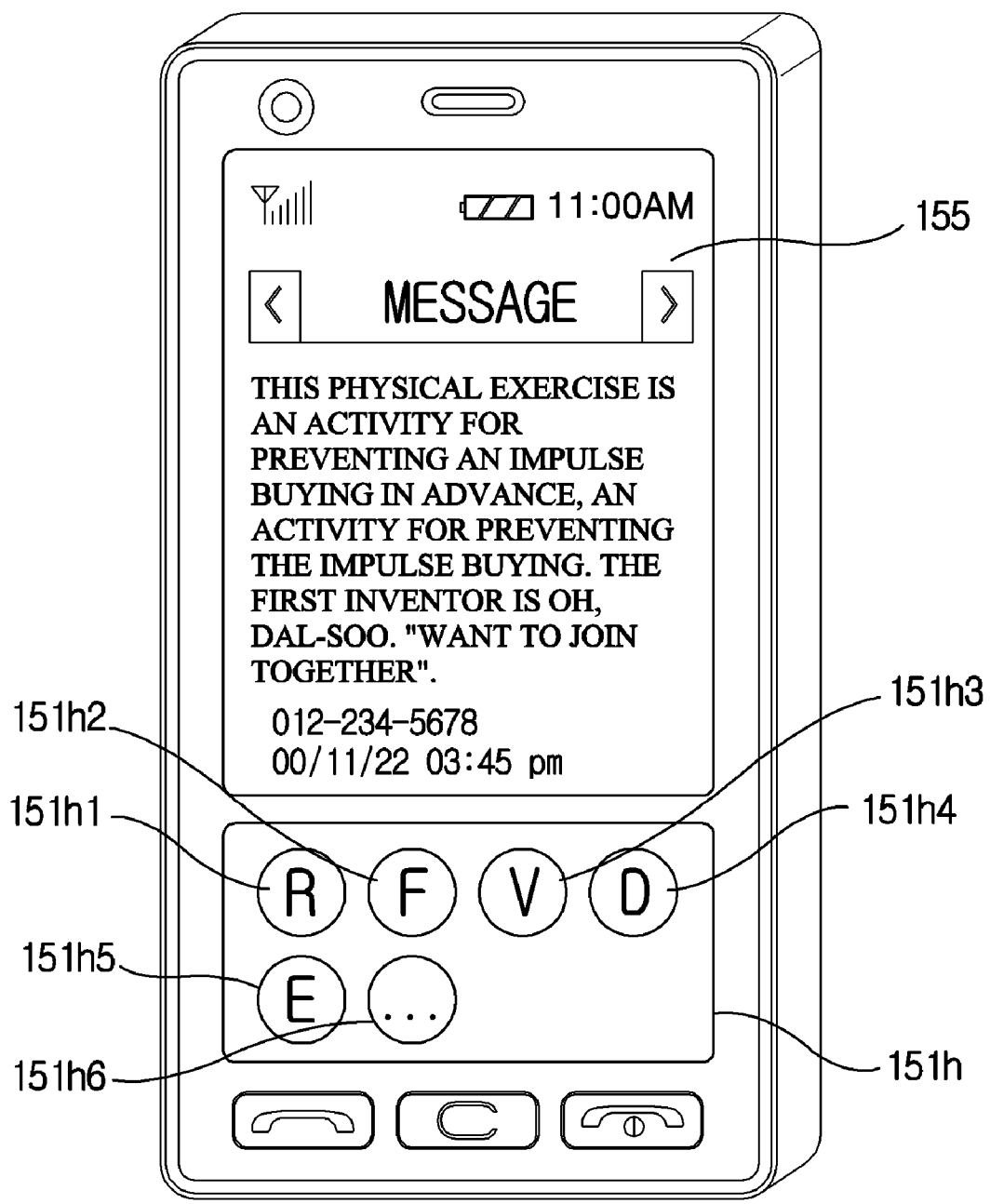

FIG. 9H illustrates a state in which a text message is displayed on the electronic paper in a mobile terminal according to the present disclosure.

As illustrated, the electronic paper 155 is displayed with a text message, and the display 151 (which is a touch screen) is displayed with text message function keys 151h. The text message function keys 151h may include a response message send key 151h-1, a send function key 151h-2, a view function key 151h-3, a delete function key 151h-4 and an edit function key 151-5. In the present embodiment, the display of the text message function key 151g on the display 151 may provide the user with a convenient UI.

As noted above, the electronic paper 155 is displayed with predetermined menus, and the display 151 (which is a touch screen) is displayed with function keys for controlling the menus or function icons, whereby the user can be provided with a very convenient UI.

FIGS. 10a and 10b illustrate a phonebook menu operating method in a mobile terminal mounted with a touch strip according to an exemplary embodiment of the present disclosure. As shown, FIG. 10 shows a mobile terminal attached with a touch strip 136. Although FIG. 10 shows the touch strip 136 provided at a right hand side of the electronic paper 155, the array of the touch strip 136 is not limited to what is shown in FIG. 10, the touch strip 136 may be provided at the left hand side, an upper surface or a bottom surface. Furthermore, it should be appreciated by skilled in the art that a plurality of touch sensors may be arrayed in parallel instead of the touch strip.

FIG. 10(a) illustrates that a phonebook list is displayed on the electronic paper in a mobile terminal provided with a touch strip according to the present disclosure.

As depicted, the electronic paper 155 is displayed with a phonebook list 200, and the display 151 (which is a touch screen) is displayed with a navigation key. A user may select one of phonebook items 201 from the phonebook list 200 using a touch strip 136 provided at the lateral surface of the electronic paper 155 or the navigation key displayed on the display 151. FIG. 10(b) shows a state following the selection of phonebook item 201.

As illustrated, the selected phonebook item 202 is displayed on the display 151. In a case one of the phonebook items 201 from the phonebook list 200 is selected using the touch strip 136, it should be apparent that a phonebook item 201 corresponding to the touched position is selected.

FIG. 11 is a schematic view illustrating a method for operating an e-book in a mobile terminal mounted with a touch strip according to an exemplary embodiment of the present disclosure.

Referring to FIG. 11(a), the electronic paper 155 is displayed with a first e-book data, and the display 151 (which is a touch screen) is displayed with a second e-book data successive to the first e-book data displayed on the electronic paper. The present exemplary embodiment can provide the user with more data at a time by displaying the e-book data in succession.

In a case a flick touch scroll input is generated in the touch strip 136 while the first and second e-book data are displayed, the scroll function is activated to scroll the e-book data. At this time, an automatic scroll function may be activated. Alternatively, in a case the user touches a part of the touch strip 136, a first e-book data 300 (hereinafter referred to as selection e-book data) of a partial area about the touched area is displayed on the display 151 as shown in FIG. 11(b). In a case the e-book data displayed on the electronic paper 155 cannot be viewed due to dark environment, the user may input a selection signal of the touch strip 136 to allow the selection e-book data to be displayed on the light emitting display 151. As a result, the user may read the e-book data even in a dark place.

As noted above, the user may select a part of the menu displayed on the electronic paper 155 and allow the selected part to be displayed on the light emitting display 151.

FIG. 12 is a schematic view illustrating a method for operating a menu in a mobile terminal mounted with a touch strip according to an exemplary embodiment of the present disclosure.

As shown in the figure, the electronic paper 155 is displayed with grid type menu icons 400. The display 151 is displayed with a navigation key 402 and a selection key 404. The user may employs the navigation key 402 and the selection key 404 to select one of the grid type menu icons displayed on the electronic paper 155. Furthermore, if the touch strip 136 displayed on the electronic paper 155 is selected, a menu icon in parallel with a selected position may be displayed on the display 151.

In this case, the menu icon displayed on the display may be selected using a pointing device, because the display 151 is a touch screen, where the pointing device may be a finger, an electronic pencil or the like.

FIG. 13 is a schematic view illustrating a state where an image file is displayed in a mobile terminal according to an exemplary embodiment of the present disclosure.

As shown, the electronic paper 155 is displayed with an image file stored in the memory 160. The image file may be generated on the camera 121, or may be a data received through the wireless communication unit 110.

Meanwhile, the display 151 may be displayed with a part or a whole image displayed on the electronic paper 155.

As illustrated, if an image displayed on the display 151 is the same as an image displayed on the electronic paper 155, the image on the display 151 may be a re-sized image because the display 151 is smaller than the electronic paper. If an image displayed on the display 151 is a part of the image displayed on the electronic paper 155, the image may be scrolled using a scroll bar (not shown) provided at one side of the display 151 or the touch strip 136 provided at the lateral surface of the electronic paper 155.

Now, a method for setting up a night mode in a mobile terminal according to the present disclosure will be described with reference to FIGS. 14 and 15. The night mode refers to a mode in which an entire data or a part of the data displayed on the electronic paper 155 is made to be displayed on the light emitting display 151, in a case where the user cannot check the data displayed on the electronic paper 155.

Figure 14:
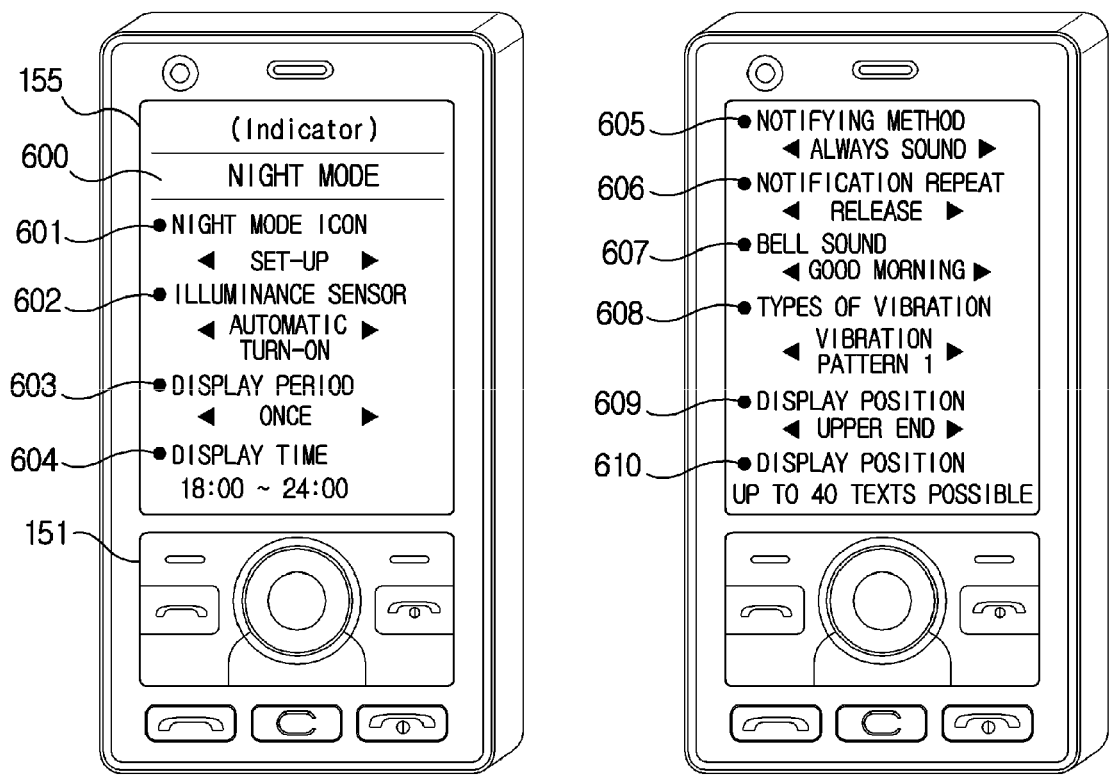
FIG. 14 is a schematic view illustrating a screen for setting up a night mode in a mobile terminal according to an exemplary embodiment of the present disclosure.
Figure 15:
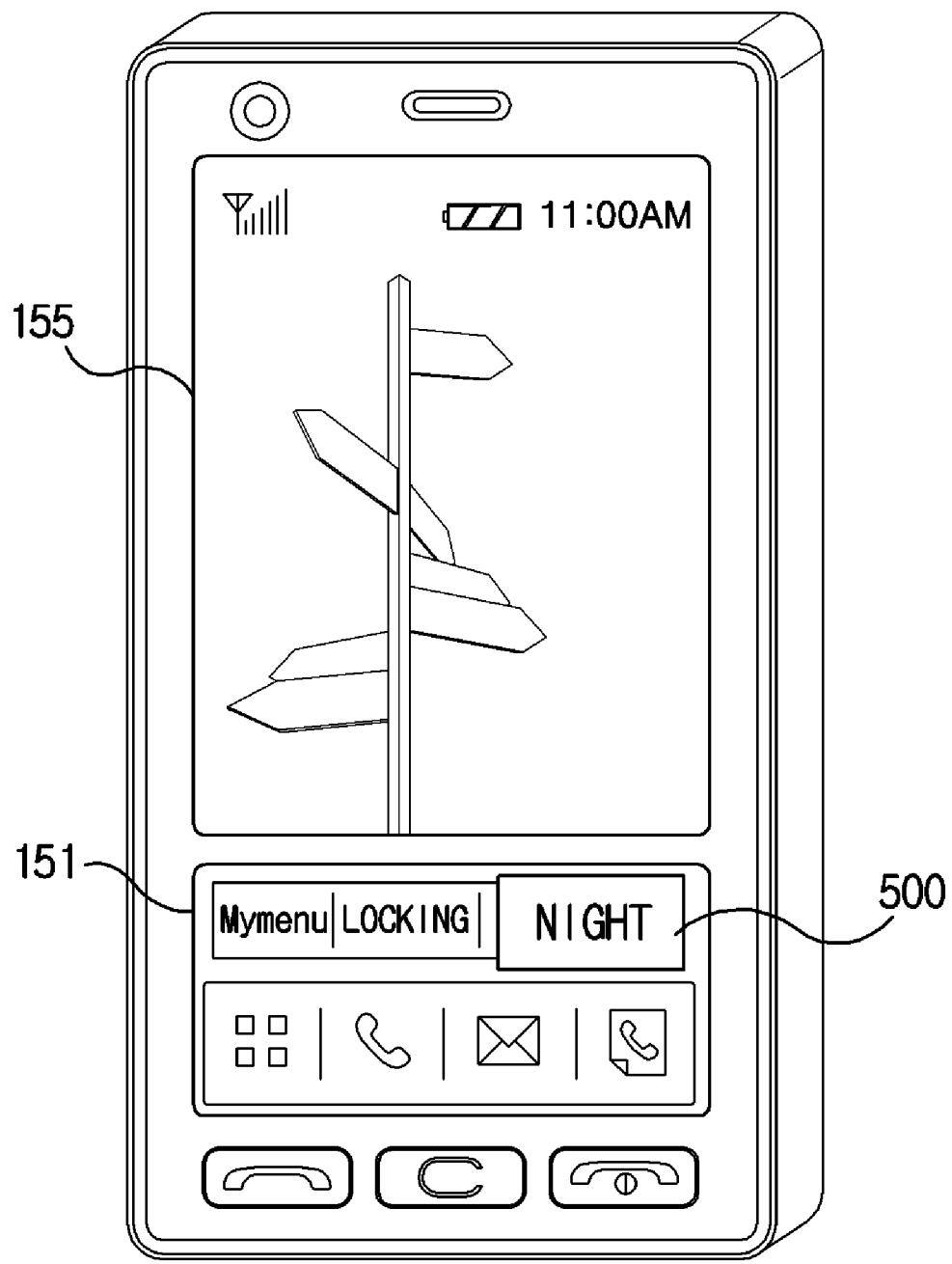
FIG. 15 is a view illustrating a state where a night mode icon is displayed in a mobile terminal according to an exemplary embodiment of the present disclosure.

FIG. 14 is a schematic view illustrating a screen for setting up a night mode in a mobile terminal according to an exemplary embodiment of the present disclosure, and FIG. 15 is a view illustrating a state where a night mode icon is displayed in a mobile terminal according to an exemplary embodiment of the present disclosure.

As shown in FIG. 14, the electronic paper 155 is displayed with a night mode setting screen 600, and the display 151 is displayed with a navigation key which is a function key for controlling the night mode setting screen 600. At this time, the display is a touch screen.

The night mode setting screen 600 may include a night mode icon item 601 for setting up whether to display a night mode setting icon on a wallpaper, an illuminance sensor icon 602 for setting up whether to automatically change a mode of the mobile terminal to a night mode using an illuminance sensor, a display period icon 603 for setting up a display frequency of the night mode, a display time icon 604 for setting up a display time of the night mode, a notifying method icon 605 for determining a method for notifying the change to night mode, a notification repeat icon 606 for setting up whether to repeat the notification, a bell sound set-up icon 607 for determining the type of bell if the notification method is by way of using a bell sound, a vibration type icon 608 for setting up the vibration type if the notification method is by way of vibration, a display position icon of night mode icon 609 for determining the position of the night mode icon to be displayed on the wallpaper, and a memo icon 610 for determining the number of texts to be displayed on the display 151.

FIG. 15 is a view illustrating a state where a night mode icon is displayed in a mobile terminal according to an exemplary embodiment of the present disclosure.

As shown in FIG. 15, the night mode set-up icon may be displayed on one side of the display 151. The night mode set-up icon may be also displayed on the electronic paper 155.

Now, methods for changing a mode of a mobile terminal to a night mode according to the present disclosure will be described with reference to FIGS. 16 and 17.

Figure 16:
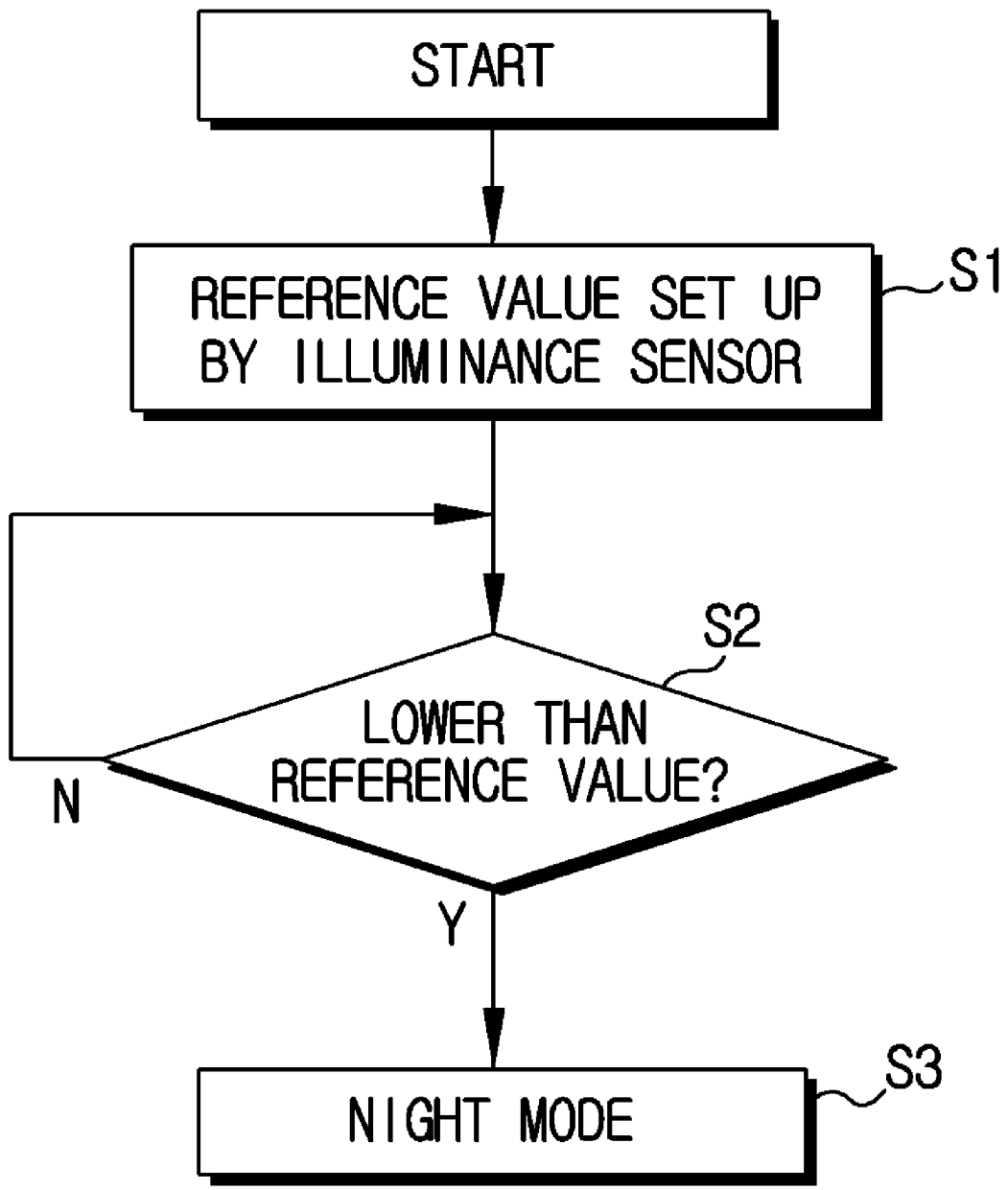
FIG. 16 is a flowchart illustrating a night mode set-up method using an illuminance sensor in a mobile terminal according to an exemplary embodiment of the present disclosure.
Figure 17:
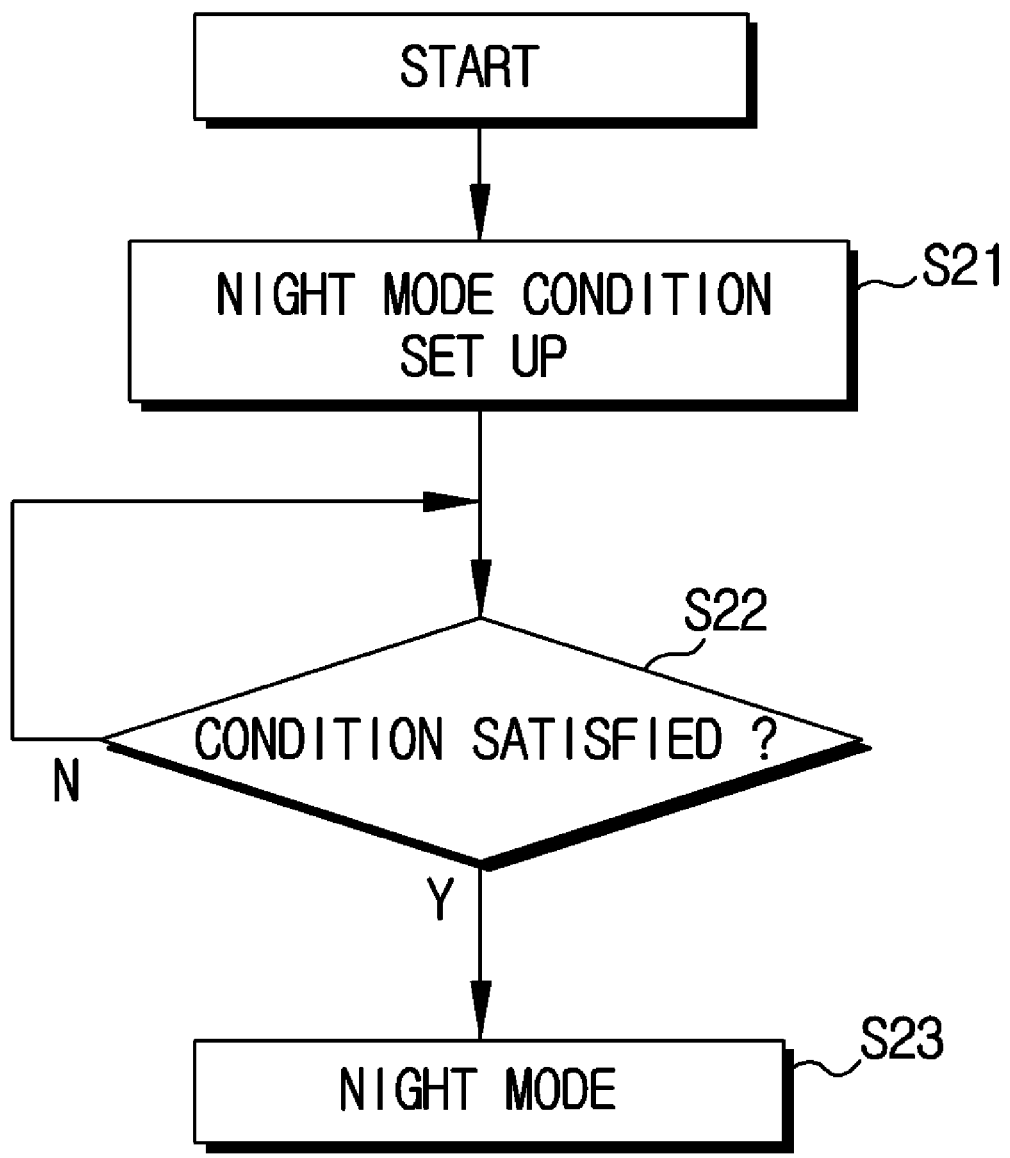
FIG. 17 is a flowchart illustrating a night mode set-up method using a user input unit in a mobile terminal according to an exemplary embodiment of the present disclosure.

FIG. 16 is a flowchart illustrating a night mode set-up method using an illuminance sensor in a mobile terminal according to an exemplary embodiment of the present disclosure, and FIG. 17 is a flowchart illustrating a night mode set-up method using a user input unit in a mobile terminal according to an exemplary embodiment of the present disclosure.

As shown in FIG. 16, the user employs the user input unit 130 to set up a reference value (a night mode reference value) for changing to a night mode relative to the illuminance sensor 142 embedded in the mobile terminal (S1). The reference value may be established by a manufacturer. The illuminance sensor 142 detects an ambient brightness. The controller 180 checks whether the ambient brightness is lower than the night mode reference value (i.e., darker than the night mode reference value) (S2). If the ambient brightness is lower than the night mode reference value, the mode of the mobile terminal is changed to a night mode (S3).

According to the processes mentioned above, the mobile terminal can automatically change its mode to a night mode based on the illuminance, whereby the user can view the e-book or an image file in a dark environment using the light emitting display 151 without recourse to a separate manipulation.

FIG. 17 is a flowchart illustrating a night mode set-up method using a user input unit in a mobile terminal according to an exemplary embodiment of the present disclosure.

The user uses a user input unit 130 to approach a menu for changing to a night mode, and uses the menu to set up a night mode changing condition (a night mode condition) (S21). The changing condition may be set up by a manufacturer in advance. The condition has been already described in detail by FIG. 14, such that no more elaboration thereto will be given.

The controller 180 checks whether the night mode changing condition is satisfactory (S2). If the condition is satisfactory, the mobile terminal 100 changes its mode to a night mode (S3).

As noted above, a method for controlling a mobile terminal may comprise: providing a mobile terminal mounted with a first display made of electronic paper and a second display made of a light emitting display; determining, by an illuminance sensor, whether an ambience has an illuminance lower than a predetermined illuminance value; and changing a mode of the mobile terminal to a night mode if the ambience has an illuminance lower than the predetermined value.

Furthermore, a method for controlling a mobile terminal may comprise: providing a mobile terminal mounted with a first display made of electronic paper and a second display made of a light emitting display; performing a set-up of a night mode through a user input unit of the mobile terminal; and changing a mode of the mobile terminal to a night mode if the night mode is set up.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a first display unit configured to provide a non-light emitting display;
   a second display unit mounted at one side of the first display unit and configured to provide a light emitting display as a touch screen;
   a memory configured to store data and a program for implementing a predetermined menu;
   an illuminance sensor configured to detect illuminance; and
   a controller configured to:

control the first display unit to display first data included in the stored data on the non-light emitting display;

control the second display unit to display second data successive to the first data on the light emitting display;

change a mode of the mobile terminal to a night mode if an illuminance lower than a predetermined brightness is detected b the illuminance sensor; and control the first display unit to turn off the non-light emitting display and control the second display unit to display the first data and the second data successive to the first data on the light emitting display when the mode of the mobile terminal is changed to the night mode.

2. The mobile terminal of claim 1, further comprising a plurality of keys located adjacent to the non-light emitting display, wherein at least a first of the plurality of keys provides a function related to movement of the first data displayed by the non-light emitting display.

3. The mobile terminal of claim 2, wherein at least a second of the plurality of keys comprises touch sensors or touch strips.

4. The mobile terminal of claim 2, wherein the function related to movement of the first displayed by the non-light emitting display comprises a scroll function.

5. The mobile terminal of claim 4, wherein the scroll function comprises page advance of the data displayed on the non-light emitting display.

6. The mobile terminal of claim 1, further comprising an input unit configured to receive a user input, wherein the controller is further configured to control the first display unit to display a first portion of the data on the non-light emitting display and control the second display unit to display a second portion of the data on the light emitting display when a selection signal is received from the user via the input unit.

7. The mobile terminal of claim 1, wherein the first display unit includes a monochrome display function and the second display unit includes a color display function.

8. The mobile terminal of claim 1, wherein:
the controller is further configured to:
control the first display unit to display a first portion of the predetermined menu on the non-light emitting display; and
control the second display unit to display a second portion of the predetermined menu on the light emitting display when a selection signal is generated during display of the first portion of the predetermined menu on the non-light emitting display.

9. The mobile terminal of claim 1, further comprising a user input unit configured to set up the night mode and wherein:
the memory is further configured to store night mode-related data; and the controller is further configured to change the mode of the mobile terminal to the night mode if a condition set up via the user input unit is met.

10. A method for controlling a mobile terminal, the method comprising:
providing a first display unit configured to provide a non-light emitting display, a second display unit configured to provide a light emitting display as a touch screen and a memory configured to store data and a program for implementing a predetermined menu and an illuminance sensor configured to detect illuminance;
controlling the first display unit to display first data included in the stored data on the non-light emitting display;
controlling the second display unit to display second data successive to the first data on the light emitting display;
changing a mode of the mobile terminal to a night mode if an illuminance lower than a predetermined brightness is detected by the illuminance sensor; and
controlling the first display unit to turn off the non-light emitting display and controlling the second display unit to display the first and second data successive to the first data on the light emitting display when the mode of the mobile terminal is changed to the night mode.

11. The method of claim 10, further comprising providing a plurality of keys located adjacent to the non-light emitting display, wherein at least a first of the plurality of keys provides a function related to movement of the first data displayed by the non-light emitting display.

12. The method of claim 11, wherein the function related to movement of the first data displayed by the non-light emitting display comprises a scroll function.

13. The method of claim 12, wherein the scroll function comprises page advance of the data displayed on the non-light emitting display.

14. The method of claim 10, further comprising:
receiving a selection signal from a user;
controlling the first display unit to display a first portion of the data on the non-light emitting display; and
controlling the second display unit to display a second portion of the data on the light emitting display.

15. The method of claim 10, further comprising:
controlling the first display unit to display a first portion of the predetermined menu on the non-light emitting display; and
controlling the second display unit to display a second portion of the predetermined menu on the light emitting display when a selection signal is generated during display of the first portion of the predetermined menu on the non-light emitting display.

* * * * *